(12) United States Patent
Orlich et al.

(10) Patent No.: US 9,545,636 B2
(45) Date of Patent: Jan. 17, 2017

(54) METHOD FOR PROCESSING MINERAL MATERIAL CONTAINING ACID-CONSUMING CARBONATE AND PRECIOUS METAL IN SULFIDE MINERALS

(71) Applicant: Newmont USA Limited, Greenwood Village, CO (US)

(72) Inventors: James Nicholas Orlich, Parker, CO (US); Ronel Du Plessis Kappes, Castle Rock, CO (US); John C. Gathje, Longmont, CO (US)

(73) Assignee: NEWMONT USA LIMITED, Greenwood Village, CO (US)

( * ) Notice: Subject to any disclaimer, the term of this patent is extended or adjusted under 35 U.S.C. 154(b) by 0 days.

(21) Appl. No.: 14/787,810

(22) PCT Filed: Apr. 23, 2014

(86) PCT No.: PCT/US2014/035188
§ 371 (c)(1),
(2) Date: Oct. 29, 2015

(87) PCT Pub. No.: WO2014/179134
PCT Pub. Date: Nov. 6, 2014

(65) Prior Publication Data
US 2016/0074872 A1    Mar. 17, 2016

Related U.S. Application Data

(60) Provisional application No. 61/817,781, filed on Apr. 30, 2013.

(51) Int. Cl.
*B03D 1/02* (2006.01)
*B03B 5/40* (2006.01)
(Continued)

(52) U.S. Cl.
CPC . *B03B 5/40* (2013.01); *B03D 1/02* (2013.01); *C22B 1/00* (2013.01); *C22B 5/14* (2013.01);
(Continued)

(58) Field of Classification Search
None
See application file for complete search history.

(56) References Cited

U.S. PATENT DOCUMENTS 3,655,044 A    4/1972  Delaney
4,676,804 A    6/1987  Miller et al.
(Continued)

FOREIGN PATENT DOCUMENTS

WO    9808585 A1    3/1998

OTHER PUBLICATIONS

Wang et al., "Understanding the Effect of CO2 on the Apatite Flotation from Catalao's Siliceous Carbonate Phosphate Ore" Flotation '13, Cape Town, South Africa. Conference Paper, Presented, Nov. 2013, 15 pages.
(Continued)

*Primary Examiner* — Thomas M Lithgow
(74) *Attorney, Agent, or Firm* — Marsh Fischmann & Breyfogle LLP; Ross E. Breyfogle

(57) ABSTRACT

Processing of mineral material containing precious metal with one or more sulfide minerals and non-sulfide gangue minerals including acid-consuming carbonate may include preparation of a sulfide concentrate by flotation with the flotation or conditioning prior to flotation using a gas comprising carbon dioxide. Flotation may be at an acidic pH without prior decomposition of the acid-consuming carbonate and may be without addition of acid for pH adjustment.

37 Claims, 10 Drawing Sheets

(51) Int. Cl.
*C22B 1/00* (2006.01)
*C22B 5/14* (2006.01)
*C22B 9/05* (2006.01)
*C22B 11/00* (2006.01)

(52) U.S. Cl.
CPC ................. *C22B 9/05* (2013.01); *C22B 11/00* (2013.01); *B03D 2201/007* (2013.01); *B03D 2203/025* (2013.01)

(56) References Cited

U.S. PATENT DOCUMENTS

| | | | |
|---|---|---|---|
| 4,710,361 A * | 12/1987 | Ostrea | B03D 1/008 209/166 |
| 5,489,326 A * | 2/1996 | Thomas | C22B 3/02 423/27 |
| 5,653,945 A | 8/1997 | Gathje et al. | |
| 5,837,210 A | 11/1998 | Simmons et al. | |
| 5,851,499 A * | 12/1998 | Gathje | C22B 3/04 423/23 |
| 5,855,770 A | 1/1999 | Clark et al. | |
| 6,041,941 A | 3/2000 | Newell et al. | |
| 6,092,666 A | 7/2000 | Clark et al. | |
| 6,210,648 B1 | 4/2001 | Gathje et al. | |
| 6,641,642 B2 * | 11/2003 | Simmons | C22B 3/44 423/27 |
| 6,679,383 B2 | 1/2004 | Gathje et al. | |
| 6,945,407 B2 * | 9/2005 | Senior | B03D 1/002 209/12.1 |
| 7,028,845 B2 * | 4/2006 | Senior | B03D 1/02 209/12.1 |
| 7,219,804 B2 | 5/2007 | Simmons et al. | |
| 2011/0155651 A1 | 6/2011 | Gorain | |
| 2011/0165059 A1 | 7/2011 | Choi | |

OTHER PUBLICATIONS

Mermillod-Blondin et al., "Pyrite Flotation with Xanthate Under Alkaline Conditions—Application to environmental Desulfurisation", Centenary of Flotation Symposium, Brisbane, Queensland, Australia, Jun. 6-9, 2005, pp. 683-692.

* cited by examiner

METHOD FOR PROCESSING MINERAL MATERIAL CONTAINING ACID-CONSUMING CARBONATE AND PRECIOUS METAL IN SULFIDE MINERALS

REFERENCE TO RELATED APPLICATIONS

This application claims the benefit of U.S. Provisional Patent Application No. 61/817,781 filed Apr. 30, 2013, the entire contents of which are incorporated herein as if set forth herein in full.

FIELD

The disclosure relates to processing precious metal refractory sulfide mineral materials containing acid-consuming carbonate, including in relation to conditioning prior to flotation, flotation to prepare a sulfide concentrate and post-flotation processing of sulfide concentrate including oxidative treatment to expose precious metal for leaching.

BACKGROUND

Significant amounts of precious metal, especially gold, are found dispersed in pyritic sulfide minerals, such as for example in pyrite, marcasite, pyrrhotite, arsenopyrite and/or arsenian pyrite. Often, very little of the gold contained in these sulfide minerals is recoverable by direct leaching with cyanide or other gold lixiviants. Rather, it is typically necessary to decompose the sulfide minerals to a significant extent to expose the gold and make the gold available to be leached. Sulfide mineral decomposition may involve an oxidative treatment, for example pressure oxidation or biooxidation. Processing may include preparing a sulfide concentrate by flotation prior to the oxidative treatment. Preparing a concentrate reduces the amount of material that must be processed in the oxidative treatment and provides higher sulfide sulfur concentrations that may be beneficial to drive desired reactions during some oxidative treatment techniques. For example, one oxidative treatment is acidic pressure oxidation in which a sulfide-containing mineral material, such as an ore, concentrate or ore/concentrate blend, is contacted with oxygen in an autoclave at elevated temperature and pressure in an acidic environment. In the autoclave, oxygen gas reacts with sulfide sulfur resulting in decomposition of sulfide minerals and generation of sulfuric acid. The sulfide sulfur oxidation is exothermic and the process may be thermally autogenous provided the feed contains a sufficiently high concentration of sulfide sulfur to generate adequate heat and sufficiently high acid concentrations.

Some ores contain significant quantities of acid-consuming carbonate that complicates processing. Many carbonate minerals, for example calcite, magnesite, siderite and dolomite, will react with sulfuric acid resulting in decomposition of the carbonate, generation of carbon dioxide and formation of sulfate salts. A small amount of acid-consuming carbonate in mineral material feed to acidic pressure oxidation feed may be acceptable, but as carbonate concentrations become larger consumption of sulfuric acid by the carbonate can be a significant detriment to the pressure oxidation operation. One way to address high concentrations of carbonate material in sulfide ores to be pressure oxidized is to pre-treat the ore with sulfuric acid to decompose the carbonates prior to being fed to the pressure oxidation autoclave, so that the carbonate will not be available to react in the autoclave and therefore will not interfere with desired reactions during pressure oxidation. However, the cost of sulfuric acid consumed in such a pre-treatment operation can be significant. For ores with high gold concentrations, the cost of pre-treatment may be justifiable, but for many carbonate-containing ores such pre-treatment may be cost prohibitive even with carbonate levels that are in the range of one weight percent, or even less in some cases.

Carbonate content in an ore can also be a significant problem for flotation processing to prepare a sulfide concentrate for oxidative treatment. For many sulfide gold ores, flotation to prepare a sulfide concentrate may be most effective if performed at an acidic pH, and feed slurries to flotation are adjusted to the desired acidic pH by addition of acid, commonly sulfuric acid. However, when the ore contains significant acid-consuming carbonate, significant acid is consumed to decompose the carbonate before the pH of the ore slurry can effectively be adjusted to the desired acidic pH for flotation. Additionally, as a result of the acidification precipitates may form that may have a very small size that can complicate flotation and post-flotation filtration of flotation concentrates, such as by causing filter plugging. Especially when mineral material contains significant acid-consuming carbonate in the form of calcite, very fine particles of calcium sulfate (gypsum) precipitate may form. The presence of such precipitates during flotation may interfere with flotation performance, which may lead to a need to perform flotation at a lower slurry solids density. Also, the presence of such precipitates in the flotation concentrate may interfere with effective dewatering of flotation concentrates, such as by filtration. Filtration plugging can become a significant problem as a result of such very fine precipitates.

SUMMARY

Processing of precious metal refractory sulfide mineral materials containing acid-consuming carbonate is disclosed in which the mineral material may be subjected to acidic flotation to prepare a sulfide concentrate without a need to decompose the carbonate from the mineral material prior to the flotation. As used herein precious metal refers to gold, silver or gold and silver, whether or not other valuable components may also be present. A slurry containing mineral material feed may beneficially be adjusted to an acidic pH for sulfide flotation through use of a carbon dioxide-containing gas. Carbon dioxide in the gas may dissolve into the slurry liquid and form carbonic acid and reduce the pH of the slurry, and with only small or insignificant decomposition of carbonates. Treatment with carbon dioxide tends to reduce the slurry to a mildly acidic pH and unexpectedly imparts beneficial other properties to the slurry that are conducive to effective flotation to prepare a sulfide concentrate. For example, it appears as though using the carbon dioxide may result in beneficial treatment of sulfide mineral surfaces, which may include removing or reducing the presence of at least some surface features that may otherwise interfere with flotation performance. Examples of some such surface features may include surface hydroxides and oxides and adsorbed calcium or magnesium-containing materials. The presence of such calcium and magnesium-containing materials may be a particular concern when processing mineral materials containing acid-consuming carbonate, because the carbonate is often in minerals with calcium and/or magnesium that provide a significant source of those materials for possible detrimental interaction with sulfide mineral surfaces. Also, dissolved calcium and magnesium that builds up in process water can be a source for those materials that can detrimentally interact with sulfide mineral surfaces. Various aspects of processing including the use of carbon dioxide are disclosed below.

A first aspect involves a method for processing mineral material containing precious metal associated with one or more sulfide minerals and non-sulfide gangue minerals, with the method comprising flotation processing including flotation of the mineral material in aqueous liquid medium at a pH less than pH 7 with flotation gas to prepare a flotation concentrate enriched in sulfide minerals and the precious metal relative to the mineral material as fed to the flotation and a flotation tail enriched in non-sulfide gangue minerals relative to the mineral material as fed to the flotation. The flotation processing includes at least one of the following:

(i) the flotation gas comprises at least 5 volume percent carbon dioxide; and
(ii) prior to the flotation, conditioning the mineral material, comprising treating a slurry including the mineral material with a conditioning gas comprising at least 5 volume percent carbon dioxide.

A number of feature refinements and additional features are applicable to this first aspect. These feature refinements and additional features may be used individually or in any combination within the subject matter of the first aspect or any other aspect of the disclosure. As such, each of the following features may be, but are not required to be, used within any other feature or combination of features of the first aspect or any other aspect.

The method of the first aspect is particularly advantageous for processing mineral material in which the non-sulfide gangue minerals comprise acid-consuming carbonate. As such the description below is provided in the context that the mineral material being processed includes acid-consuming carbonate, even though such is not required for all processing variations of this first aspect.

The flotation may be conducted at a suitable acidic pH. In some processing variations, the flotation may be conducted at a pH of not greater than pH 6.5 not greater than pH 6.4, not greater than pH 6.3, not greater than pH 6.2, not greater than pH 6.1, not greater than pH 6.0, not greater than pH 5.9, not greater than pH 5.8 or not greater than pH 5.7. In some processing variations, the flotation may be conducted at a pH of not lower than pH 5, not lower than pH 5.1, not lower than pH 5.2, not lower than pH 5.3, not lower than pH 5.4 or not lower than pH 5.5. The method may be essentially in the absence of pH adjustment with addition of sulfuric acid, or with addition of any other acid. Adjustment of pH prior to or during flotation may be accomplished essentially in the absence of adding acid to the slurry, and may be due primarily or even essentially or entirely to the use of carbon dioxide in the flotation gas and/or conditioning gas. Not to be bound by theory, carbon dioxide may dissolve in aqueous slurry liquid to generate carbonic acid in the slurry liquid that lowers the pH of the slurry liquid, without addition of acid (e.g., sulfuric acid) to the slurry and the slurry liquid tends to settle at mildly acidic pH in a relatively narrow pH range suitable for flotation. Flotation pH's below pH 5 may be used, but operating at such low pH's may involve higher rates of carbon dioxide sparging, higher concentrations of carbon dioxide in the flotation gas and/or maintaining a positive head pressure during flotation to increase carbon dioxide partial pressure in the system.

In some preferred processing variations, the method may include the conditioning prior to flotation. During the conditioning a slurry including the mineral material may be treated with a conditioning gas comprising at least 5 volume percent carbon dioxide. It has been found that including the conditioning is particularly beneficial to help prepare the mineral material for effective flotation. During the conditioning, the pH of the mineral material may be adjusted to an appropriate acidic pH in preparation for flotation and the sulfide mineral grain surfaces may be cleaned to promote good flotation of sulfide mineral species. Because of the presence of carbonate minerals in the mineral material, the slurry will often have a natural pH in an aqueous slurry that is basic. The conditioning may include reducing the pH of the slurry by at least 0.5 pH unit, at least 0.7 pH unit, at least 1 pH unit, at least 1.2 pH units or at least 1.5 pH units. The conditioning may include reducing the pH of the slurry by not more than 3.5 pH units, not more than 3 pH units, not more than 2.5 pH units or not more than 2 pH units. The conditioning may include reducing the pH of the slurry from a first pH that is greater than pH 8, greater than pH 7.5, greater than pH 7, greater than pH 6.5 or greater than pH 6.3 to a second pH that is not greater than pH 6.5, not greater than pH 6.4, not greater than pH 6.3, not greater than pH 6.2, not greater than pH 6.1, not greater than pH 6.0, not greater than pH 5.9, not greater than 5.7 or not greater than 5.6, provided that the second pH is lower than the first pH. The second pH may be at least pH 5, at least pH 5.1, at least pH 5.2, at least pH 5.3, at least pH 5.4 or at least pH 5.5. The first pH may be not greater than pH 9, not greater than pH 8.5 or not greater than pH 8. The slurry may be at the second pH at the completion of the conditioning. During the conditioning, the conditioning gas may be contacted with the slurry to promote dissolution of carbon dioxide into the slurry liquid. Any apparatus and technique may be used to intimately contact the conditioning gas with the slurry. For, example, the conditioning gas may be sparged into the slurry during the conditioning. As another example, the conditioning gas may be mixed with the slurry in an in-line mixer, for example in-line in a conduit in which the slurry is flowing and into which the conditioning gas may be injected to contact the slurry. The carbon dioxide may be mixed with the slurry under pressure to increase dissolution of carbon dioxide into the slurry liquid (e.g., flowing in a conduit under pressure or in a pressurized mixing vessel). It has been found that as the conditioning with carbon dioxide continues, the slurry will settle at a relatively constant pH, often within a few or several minutes. The treatment may include sparging or otherwise introducing the conditioning gas into the slurry for at time of at least 2 minutes, at least 5 minutes or at least 10 minutes. The time may often be less than 40 minutes, less than 30 minutes or less than 20 minutes. When processing does not include the conditioning, the mineral material may be fed to the flotation at such a first pH and the pH may be quickly reduced to such a second pH due to the carbon dioxide in the flotation gas.

Importantly, the reduction of the pH of the slurry during the conditioning may be accomplished without any, or essentially in the absence of adding, sulfuric acid or other acid to the slurry. The reduction of pH may be due primarily or essentially to the carbon dioxide in the conditioning gas, which generates carbonic acid when dissolved into the aqueous liquid of the slurry. The pH in the slurry may tend to settle at a relatively constant pH that is mildly acidic. During the conditioning, at least a portion of the carbon dioxide in the conditioning gas will be consumed through dissolution into the slurry liquid. In some preferred processing variations, the concentration of carbon dioxide in the conditioning gas may be high enough that all of the carbon dioxide is not consumed by the slurry, and effluent gas off of the slurry still contains at least some carbon dioxide.

As part of the conditioning, or prior to or after the conditioning, one or more other flotation reagents may be added to the slurry. Such reagents may include for example, collectors, promoters, frothers, activators and/or depressants. Preferred collectors include xanthate collectors (e.g., potassium amyl xanthate).

The conditioning gas may comprise more than 5 volume percent carbon dioxide. The conditioning gas may comprise at least 10 volume percent of carbon dioxide, at least 15 volume percent carbon dioxide, at least 25 weight volume percent carbon dioxide, at least 50 volume percent carbon dioxide, at least 75 volume percent carbon dioxide, at least 85 volume percent carbon dioxide, at least 95 volume percent carbon dioxide, or even at least 99 volume percent carbon dioxide. The conditioning gas may consist of or consist essentially of carbon dioxide. Typically, however, it is not required that 100% carbon dioxide be used for the conditioning gas. In some other processing variations, the conditioning gas may comprise no more than 75 volume percent carbon dioxide, no more than 50 volume percent carbon dioxide, no more than 25 volume percent carbon dioxide, no more than 20 volume percent carbon dioxide gas or no more than 15 volume percent carbon dioxide. The portion of the conditioning gas not made up of carbon dioxide may be provided by one or more other gas components.

Surprisingly, beneficial processing may be obtained even if the conditioning gas is a gas mixture comprising carbon dioxide and air, which in some processing variations may consist of or consist essentially of carbon dioxide and air. The benefits provided by the carbon dioxide may outweigh any detrimental effects of oxygen gas in the air, such as potential surface oxidation of sulfide mineral grains.

In some processing variations, however, the amount of oxygen gas in the conditioning gas may be restricted to further reduce potential detrimental effects of oxygen gas. The conditioning gas may be formulated to comprise no more than 19 volume percent oxygen gas, no more than 18 volume percent of oxygen gas, no more than 15 volume percent oxygen gas, no more than 10 volume percent oxygen gas, no more than 5 volume percent oxygen gas, no more than 2 volume percent oxygen gas or even no more than 1 volume percent oxygen gas. The oxygen gas in the conditioning gas may be provided for example by mixing air with carbon dioxide gas and/or one by mixing a purified oxygen gas stream with carbon dioxide. Air includes about 20 volume percent oxygen gas, and a conditioning gas made by mixing carbon dioxide gas and air will result in a conditioning gas composition having an oxygen gas content that is smaller than 20 volume percent. The conditioning gas may be free of or essentially free of oxygen gas. In some processing variations, however, the conditioning gas may include significant oxygen gas, such as when the conditioning gas may be a mixture of carbon dioxide gas with air. The conditioning gas may include at least 5 volume percent oxygen gas, at least 10 volume percent oxygen gas, at least 15 volume percent oxygen gas or at least 16 volume percent oxygen gas. Even with some oxygen gas present, the carbon dioxide content may sufficiently reduce slurry pH and may provide a cleansing effect to clean surfaces of sulfide mineral grains.

In some preferred processing variations, the conditioning gas may be a gas mixture including carbon dioxide and nitrogen gas. The nitrogen gas in the gas mixture may be an essentially inert component, as opposed to the reactive nature of oxygen gas in a gas mixture. The conditioning gas may comprise at least 50 volume percent nitrogen gas, at least 75 volume percent nitrogen gas, at least 80 volume percent nitrogen gas, at least 85 volume percent nitrogen gas or even at least 90 volume percent or more of nitrogen gas. The conditioning gas may be a gas mixture comprising at least 90 volume percent, at least 95 volume percent, at least 98 volume percent or at least 99 volume percent of a combination of carbon dioxide and nitrogen gas. The conditioning gas may consist of or consist essentially of carbon dioxide and nitrogen gas.

When the conditioning gas includes one or more other gas components in addition to carbon dioxide gas, for example from air or a purified nitrogen gas source, the conditioning gas may be introduced into the slurry in the form of a pre-mixed gas composition including all such gas components. In some alternative variations, different gaseous components of the conditioning gas may be introduced into the slurry in separate gas streams. For example a conditioning gas including carbon dioxide and nitrogen may be introduced into the slurry as a pre-mixed composition including both carbon dioxide and nitrogen, or separate nitrogen gas and carbon dioxide gas streams may be introduced separately into the slurry.

In some processing variations, conditioning gas comprising carbon dioxide and nitrogen gas may be provided by processing including combusting a carbonaceous fuel to form a combustion exhaust gas including carbon dioxide and preparing the conditioning gas including at least a portion of the combustion exhaust gas. The conditioning gas may be or consist essentially of combustion exhaust, with condensable components substantially removed. The condensable components may be primarily water that condenses out of the combustion exhaust when cooled below the boiling point of water. For example, complete combustion of methane may produce a gas mixture that, after condensing out water, may be used as a conditioning gas and may contain for example approximately 12 volume percent carbon dioxide, 87 volume percent nitrogen gas and 1 volume percent miscellaneous other gas components (mostly argon). As another example, combustion of coal may produce a gas mixture that may be used as a conditioning gas and may contain for example approximately 21 volume percent carbon dioxide, 78 volume percent nitrogen gas and 1 volume percent miscellaneous other components (mostly argon).

In some preferred processing variations, the conditioning gas may consist of or consist essentially of carbon dioxide (e.g., essentially pure carbon dioxide). In some other preferred processing variations, the conditioning gas may consist of or consist essentially of only carbon dioxide and inert gas, which may be for example nitrogen gas.

In some processing variations, conditioning gas may be provided by decomposing carbonate of carbonate-containing mineral material to generate carbon dioxide and preparing the conditioning gas to include at least a portion of that carbon dioxide. For example, the carbonate-containing mineral material may be a separate precious metal-bearing material, such as a separate carbonate-containing sulfide gold ore being pretreated with acid prior to acidic oxidative treatment. As another example, the processing may include calcining carbonate-containing material (e.g., calcite, limestone, dolomite) to produce carbon dioxide gas. In some preferred variations, the processing may include calcining limestone to prepare lime (CaO). The lime may be beneficially used to neutralize acid generated in operations, such as may be generated during oxidative pretreatment of sulfide ores and concentrates (e.g., pressure oxidation, biooxidation).

In some preferred processing variations, at least some of the carbon dioxide and/or other gas components (e.g., nitrogen gas) of the conditioning gas may be provided by recycle from effluent gas recovered from conditioning and/or flotation operations. Recycle of carbon dioxide may significantly reduce the requirement for providing a fresh supply of carbon dioxide for use to prepare flotation and/or conditioning gases. The recycle of carbon dioxide may involve separation of carbon dioxide from a gas effluent from conditioning and/or flotation operations and recycle of a separated carbon dioxide stream, or may involve recycle of a gas mixture recovered from conditioning and/or flotation operations with or without treatment or composition adjustment prior to recycle. Additional make-up of fresh carbon dioxide may be added as needed to compensate for carbon dioxide consumption, bleed or system losses.

When the method includes the conditioning, the flotation gas may or may not also contain carbon dioxide. The flotation gas may, for example, be or consist essentially of nitrogen gas, air or other gas mixtures not containing carbon dioxide or containing carbon dioxide at a concentration smaller than 5 volume percent. However, in some preferred processing variations, the flotation gas comprises at least 5 volume percent carbon dioxide whether or not conditioning is performed prior to flotation. In some preferred processing variations, however, the flotation gas comprises not more than 19 volume percent oxygen gas, not more than 15 volume percent oxygen gas, not more than 10 volume percent oxygen gas, not more than 5 volume percent oxygen gas, not more than 2 volume percent oxygen gas or not more than 1 volume percent oxygen gas, or for the flotation gas to be free of or essentially free of oxygen gas. As with the conditioning gas, when the flotation gas includes an oxygen gas component, the oxygen gas may be provided by mixing air or by mixing a purified oxygen gas stream with one or more other gases to be included in the flotation gas composition. In some variations when the flotation gas does not include carbon dioxide, the flotation gas may consist of or consist essentially of nitrogen gas or another inert gas (e.g., argon). In some particularly preferred processing variations, the flotation gas may comprise carbon dioxide at least at a concentration sufficient to maintain a desired pH during the flotation. The flotation gas and the conditioning gas need not have the same composition. For example, the slurry may already be at a desired acidic pH prior to flotation as a result of the conditioning, and the flotation gas may need only a smaller concentration of carbon dioxide to maintain an appropriate acidic pH, as opposed to the conditioning gas which may involve higher consumption of carbon dioxide to reduce the pH of the slurry from a basic pH to an acidic pH for flotation. For operating convenience, the flotation gas and the conditioning gas may have the same concentration. Whether or not the processing includes the conditioning prior to the flotation, the flotation gas preferably includes at least 1 volume percent carbon dioxide and more preferably at least 5 volume percent carbon dioxide. The flotation gas may have a larger, the same or smaller volume percentage of carbon dioxide compared to the carbon dioxide content of the conditioning gas. In some preferred processing variations, the flotation gas may have a carbon dioxide content that is equal to or that is lower than the carbon dioxide content in the conditioning gas. For processing variations when a flotation gas is used that comprises at least 5 volume percent carbon dioxide, the flotation gas may have any of the compositions or properties described previously for the conditioning gas, and the flotation gas and the conditioning gas may be independently selected from such compositions.

In some preferred processing variations, the flotation gas consists essentially of only carbon dioxide and nitrogen gas. Carbon dioxide for use in a flotation gas may be provided in any manner similar to the discussion above concerning providing carbon dioxide for use in a conditioning gas.

In some processing variations, the flotation gas may include at least 5 volume percent carbon dioxide and at least 80 volume percent air, at least 85 volume percent air or even at least 90 volume percent air. The carbon dioxide may be in sufficient quantity to maintain a desired pH and may assist keeping sulfide mineral grains relatively clean during the flotation. However, the high concentration of air in the flotation gas may provide an enhanced safety situation because the gas is not devoid of oxygen and poses a reduced risk to personnel in the event of a release of the flotation gas into the ambient environment. Also, because at least some of the carbon dioxide may be consumed through dissolution into the flotation slurry, effluent gas from flotation may have a higher concentration of oxygen gas than flotation gas feed. Also, air is readily available and use of some air reduces the requirements for providing a supply of carbon dioxide gas.

In situations when flotation includes multiple flotation stages (e.g., rougher, cleaner, scavenger) carbon dioxide may be used in none, some or all flotation stages. Likewise, if flotation includes multiple parallel flotation trains, carbon dioxide flotation gas may be used in none, some or all of the parallel trains. In some preferred processing variations, when flotation gas comprising at least 5 weight percent carbon dioxide is used, the flotation gas for all flotation stages comprises at least 5 weight percent carbon dioxide, although and concentration of carbon dioxide and composition of flotation gas may be but need not be the same in all stages. Likewise with multiple parallel flotation trains, when flotation gas comprising at least 5 weight percent carbon dioxide is used in one parallel train, flotation gas comprising at least 5 weight percent carbon dioxide may be used in all of the parallel trains, and the concentration of carbon dioxide and composition of flotation gas may be but need not be the same in all trains.

When processing includes the conditioning, if the conditioning includes multiple stages or multiple parallel conditioning trains, the conditioning gas in one, some or all of the stages or trains may contain at least 5 volume percent carbon dioxide, and the conditioning gas compositions in the stages or trains may or may not be the same or include the same gas composition.

An important advantage of the method is that the mineral materials containing significant quantities of acid-consuming carbonate may be subjected to flotation at an acidic pH to prepare a bulk sulfide concentrate without removing the acid-consuming carbonate prior to flotation. Importantly, during the flotation very little or none of the acid-consuming carbonate may be decomposed. In addition to not consuming acid through reaction with carbonates, avoiding decomposition of carbonates also tends to reduce the amount of dissolved components such as calcium and magnesium that may detrimentally interact with sulfide surfaces during flotation. Also, there will be a reduced potential for formation of precipitates, such as calcium sulfate precipitates, that may interfere with flotation or with post-flotation filtration of flotation concentrate. Also, neutralization requirements on resulting streams may be beneficially reduced. Not only is slurry pH often not reduced to as a low a pH using carbon dioxide compared to conventional flotation with acid addition, but in the case of using carbon dioxide the pH of processed liquid will tend to increase naturally as a result of carbon dioxide being released from solution as carbon dioxide introduction into the slurry is discontinued. The pH increase may be accelerated and augmented by bubbling a gas, such as air or nitrogen, through the liquid to help strip carbon dioxide from the liquid. For example, lime or other base addition requirements to increase the pH of flotation tails disposal or to an alkaline pH for cyanide or other leaching of gold may be significantly reduced relative to conventional flotation practice using sulfuric acid to acidify slurry liquid for flotation. This benefit is in addition to reduction or elimination of requirements for sulfuric acid addition prior to flotation relative to conventional flotation practice. Bleed liquid from the flotation operation may likewise have smaller neutralization requirements. In some processing variations, the pH of flotation tails may be increased by at least 0.3 pH unit, at least 0.5 pH unit or even at least 1 pH unit as a result of carbon dioxide removal from liquid associated with the tails. In some processing variations, the tails may be subjected to gold leaching following such a pH increase and any additional pH adjustment desired for the gold leach. Gold leaching may involve leaching by any gold lixiviant, for example cyanide, thiosulfate or thiocyanate lixiviants. In some implementations, a gold leach may be conducted at a pH of at least pH 8, In some processing variations, not more than 10 percent, not more than 5 percent or not more than 1 percent of the acid-consuming carbonate may be decomposed during the flotation. In some processing variations, during the flotation at least a majority, and often most, of the acid-consuming carbonate fed to the flotation may be recovered in the flotation tail, and the flotation concentrate may contain smaller amounts, if any, of acid-consuming carbonate. The flotation concentrate may then be further processed, such as by oxidative treatment, without the burden of the full amount of the acid-consuming carbonate in the mineral material as fed to the flotation. In some processing variations at least 60 weight percent, at least 70 weight percent or at least 80 weight percent of the acid-consuming carbonate fed to the flotation may be recovered in the flotation tail. In other processing variations, the acid-consuming carbonate fed to the flotation may report in relatively equal proportions to the flotation concentrate and the flotation tail or even a majority of the acid-consuming carbonate may report to the flotation concentrate. Even in situations when a majority of the carbonates do not report to the flotation tail, the flotation concentrate will still be adequately concentrated in the desired sulfide minerals and precious metal.

The method may advantageously process mineral materials containing a range of acid-consuming carbonate contents and may process mineral materials containing large concentrations of acid-consuming carbonate. The mineral material as fed to the flotation may comprise at least 0.1 weight percent, at least 0.25 weight percent, at least 0.5 weight percent, at least 1 weight percent, at least 2 weight percent, at least 3 weight percent, at least 4 weight percent or even at least 5 weight percent or more of acid-consuming carbonate. The mineral material as fed to the flotation may comprise not more than 50 weight percent, not more than 40 weight percent or even not more than 30 weight percent of acid-consuming carbonate. The mineral material as fed to the flotation may have a significant acid-consuming capacity, as determined by the amount of sulfuric acid required to decompose all or essentially all of the acid-consuming carbonate. In some processing variations, the method may be performed essentially in the absence of contacting the mineral material with sulfuric acid during or prior to the flotation. The ore may have an acid consuming capacity of at least 0.25, at least 0.5, at least 1, at least 2, at least 5, at least 10 or even at least 20 kg of sulfuric acid per tonne of the mineral material, as determined by the quantity of sulfuric acid required to form an aqueous slurry with the mineral material at a pH of 5.5 for flotation processing.

In some preferred processing variations, most or essentially all of the acid-consuming carbonate fed to the flotation may be recovered in the flotation concentrate and the flotation tail, so that the flotation tail and the flotation concentrate together may comprise at least 0.1 weight percent, at least 0.5 weight percent, at least 1 weight percent, at least 2 weight percent, at least 3 weight percent, at least 4 weight percent or even at least 5 weight percent or more of acid-consuming carbonate, relative to the combined weight of the flotation tail and the flotation concentrate. The flotation concentrate and the flotation tail together may often comprise not more than 50 weight percent, not more than 40 weight percent or not more than 30 weight percent of acid-consuming carbonate, relative to the combined weight of the flotation tail and the flotation concentrate.

In some processing variations, acid-consuming carbonate content of a material (e.g., mineral material feed to conditioning or flotation, flotation concentrate or flotation tail) may refer to carbonate in the material that will decompose if the mineral material is slurried with water and acidified with sulfuric acid to obtain an acidified slurry with a reasonably stable acidic pH of no higher than pH 5.5.

The acid consuming carbonate may be present in a variety of carbonate minerals. Many of these carbonate minerals may contain group 2 metals (alkaline earth metals), and particularly calcium and/or magnesium such as for example in dolomite, calcite or magnesite. In some processing variations, the mineral material when fed to the flotation may comprise at least 1 weight percent, at least 2 weight percent, at least 2.5 weight percent, at least 3 weight percent, at least 3.5 weight percent, at least 5 weight percent, or at least 8 weight percent, at least 10 weight percent, at least 15 weight percent or at least 20 weight percent or more of carbonate minerals containing calcium and/or magnesium, which in some processing variations may be selected from the group consisting of dolomite, calcite, magnesite and siderite; may be selected from the group consisting of dolomite, calcite and magnesite or may be selected from the group consisting of dolomite and calcite. In some processing variations, any one of dolomite, calcite, magnesite or siderite may be present in the mineral material at such concentrations when fed to the flotation. In some processing variations the mineral material as fed to the flotation may include significant amounts of calcium and/or magnesium, which may be at least 0.5 weight percent, at least 1 weight percent, at least 2 weight percent, at least 3 weight percent, at least 5 weight percent or even at least 10 weight percent or more calcium, magnesium or combined magnesium and calcium contained in carbonate minerals.

The mineral material as fed to the flotation may comprise a significant amount of sulfide minerals, at least some of which contain precious metal, which may be or include gold. The mineral material may comprise at least 0.5 weight percent sulfide sulfur, at least 1 weight percent sulfide sulfur, at least 1.5 weight percent sulfide sulfur or at least 2 weight percent sulfide sulfur. The mineral material may often include no more than 5 weight percent sulfide sulfur, no more than 4 weight percent sulfide sulfur or no more than 3 weight percent sulfide sulfur. The flotation may be a bulk sulfide flotation with a majority of sulfide minerals by weight being recovered in the flotation concentrate. Bulk sulfide flotation is distinguished from selective sulfide flotation in which one sulfide mineral is to be floated selectively relative to a different sulfide mineral that is to be depressed during flotation to effect a separation between the different sulfide minerals. In some processing variations the recovery of sulfide sulfur in the concentrate may be at least 70 percent, at least 80 percent, at least 85 percent or at least 90 percent. The mineral material may be a refractory sulfide precious metal ore, an ore blend or a portion of such an ore or ore blend. The precious metal may include gold and/or silver.

The method may be particularly advantageous for processing gold-bearing mineral materials in which a significant amount of the gold is refractory gold (not amenable to direct cyanide leaching) contained in sulfide minerals that have a high susceptibility to oxidation and tend to be difficult to float. As summarized in U.S. Pat. No. 6,210,648 some gold-bearing refractory sulfide minerals are iron and arsenic-containing sulfides. For example, Arsenopyrite (FeAsS) may contain gold in its mineral lattice. Other examples are arsenian iron sulfides, such as for example arsenian pyrite, arsenian marcasite and arsenian pyrrhotite. These arsenian iron sulfides have some compositional differences relative to the corresponding pure minerals (e.g., pyrite, marcasite and pyrrhotite) in that the arsenian iron sulfides include arsenic in the mineral lattice in a manner that also permits the inclusion of gold in the mineral lattice. The arsenic provides irregularity in the mineral lattice relative to the pure iron sulfide minerals. The irregularity provides space within the sulfide mineral lattice to accommodate the presence of gold atoms, but also increases the susceptibility of the arsenian iron sulfides to oxidation in the presence of air and to galvanic interaction, both of which are detrimental to flotation of those sulfide species. Much of the gold in ores from the Carlin area of Nevada is contained in such arsenian iron sulfides Some other gold-bearing refractory sulfides are arsenic-rich sulfide species, such as those based on orpiment and realgar, which may include small quantities of iron in the mineral lattice that provide irregularity to permit the inclusion of gold. To improve flotation recovery especially of gold-bearing sulfide species that are highly susceptible to oxidation, such as arsenian iron sulfides, U.S. Pat. No. 6,210,648 proposes processing in which the ore being processed may be maintained in an environment that is substantially free of oxygen beginning with comminution of the ore and ending with recovery of the desired sulfide concentrate produced by flotation.

With the method of the first aspect of this disclosure, the mineral material as fed to the flotation may comprise at least 1 weight percent, at least 2 weight percent or at least 3 weight percent iron-containing sulfide minerals, at least some of which may be precious metal-bearing, and the flotation concentrate may be enriched in the iron-containing sulfide minerals relative to the mineral material as fed to the flotation. The mineral material as fed to the flotation may often comprise no more than 10 weight percent, no more than 7 weight percent, or no more than 5 weight percent iron-containing sulfide minerals. The mineral material as fed to the flotation may comprise at least 0.5 weight percent sulfide minerals, some or all of which may be precious metal-bearing, comprising both iron and arsenic and the flotation concentrate may be enriched in such sulfide minerals relative to the mineral material as fed to the flotation. The mineral material as fed to the flotation may comprise at least 0.5 weight percent sulfide minerals, some or all of which may be precious metal-bearing selected from the group consisting of arsenopyrite, arsenian pyrite, arsenian pyrrhotite, arsenian marcasite and combinations thereof and the flotation concentrate may be enriched in the sulfide minerals relative to the mineral material as fed to the flotation. The mineral material as fed to the flotation may comprise at least 0.3 weight percent arsenian iron sulfides, some or all of which may be precious metal-bearing and which in some processing variations may be selected from the group consisting of arsenian pyrite, arsenian marcasite and arsenian pyrrhotite, and the flotation concentrate may be enriched in such arsenian iron sulfides relative to the mineral material as fed to the flotation. The mineral material as fed to the flotation may comprise at least 500, at least 1000, at least 1500 or at least 2000 parts per million by weight of arsenic and the flotation concentrate may be enriched in the arsenic relative to the mineral material as fed to the flotation. The mineral material as fed to the flotation may comprise at least 0.3 weight percent sulfide minerals, some or all of which may be precious metal-bearing, selected from the group consisting of arsenopyrite, arsenian pyrite, arsenian pyrrhotite, arsenian marcasite and combinations thereof and the flotation concentrate may be enriched in the precious metal-containing sulfide minerals relative to the mineral material as fed to the conditioning. The mineral material as fed to the flotation may comprise at least 0.2 parts per million by weight of gold or at least 0.5 parts per million by weight of gold, and the flotation concentrate may be enriched in the gold relative to the mineral material as fed to the flotation.

Advantageously, elimination of oxygen from processing with the method of the first aspect may not be required, as noted previously. Comminution prior to flotation or conditioning may be performed in air, and may be performed in the absence of an oxygen-deficient blanketing gas, in the absence of sealed comminution equipment and/or in the absence of stripping dissolved oxygen from process water prior to using the process water to form a slurry with the mineral material for processing in the conditioning or the flotation.

The flotation may advantageously be effectively performed even when the liquid medium during flotation may contain significant dissolved calcium and/or magnesium. This is important because calcium has potential to interact with sulfide mineral surfaces, and especially iron sulfide mineral surfaces, in a way that may tend to depress flotation of some or all of the sulfide minerals. For example, calcium reagents are sometimes used in flotation operations to depress pyrite, for example in selective flotation operations where another sulfide is being selectively recovered relative to pyrite. For example, in some processing variations, the liquid medium during the flotation may comprise a concentration of calcium or magnesium, or of a combined concentration of dissolved calcium and magnesium, of at least 500 milligrams per liter. This may permit the use of a broader range of process waters and/or with fewer reagent additions to counteract depressant effects that calcium and/or magnesium, may have during flotation. The flotation processing may be performed essentially in the absence of adding calcium-containing reagent When the method includes the conditioning, the conditioning may be performed with little if any decomposition of the acid-consuming carbonate. During the conditioning, and during both of the conditioning and the flotation, not more than 10 percent, not more than 5 percent or even not more than 1 percent of the acid-consuming carbonate may be decomposed. The mineral material as fed to the conditioning may have any of composition or other properties described above for the mineral material as fed to the flotation, and the mineral material may have any such composition or other properties before and after the conditioning and as fed to the flotation.

In some processing variations, the method of the first aspect may include separate flotation processing of different size fractions of a mineral material feed. This may be particularly beneficial for processing mineral materials including significant gold contained in arsenian iron sulfides, because those sulfides have a tendency to be more concentrated in smaller-size particles following comminution. Recoveries of such smaller-size particles in flotation concentrate may be enhanced by separating mineral material feed into different particle size fractions that are subjected to flotation separately. This may permit larger-size particles to be subjected to flotation at a higher slurry density and the smaller-size particles to be subjected to flotation at a lower slurry density that is conducive to better recovery of the smaller-size particles. This may also help to reduce entrainment losses of smaller-size particles. In some instances the method may include size separation of a mineral material feed into at least two fractions, with a first fraction having a smaller weight average particle size and a second said fraction having a larger weight average particle size. The mineral material feed may have precious metal associated with one or more sulfide minerals and non-sulfide gangue including acid-consuming carbonate, and may have any compositional or other property described above. Each of the first fraction and the second fraction may include a portion of the precious metal from the mineral material feed and a portion of the acid-consuming carbonate from the mineral material feed. A first mineral material including at least a portion of the first fraction may then be subjected to first flotation processing comprising first flotation in aqueous liquid medium at a pH less than pH 7 and with first flotation gas to prepare a first flotation concentrate enriched in sulfide minerals and precious metal relative to the first mineral material as fed to the first flotation concentrate and a first flotation tail enriched in non-sulfide gangue minerals relative to the first mineral material as fed to the first flotation. A second mineral material including at least a portion of the second fraction may be subjected to second flotation processing comprising second flotation in aqueous liquid medium at a pH less than pH 7 with second flotation gas to prepare a second flotation concentrate enriched in sulfide minerals and precious metal relative to the second mineral material as fed to the second flotation and a second flotation tail enriched in non-sulfide gangue minerals relative to the second mineral material as fed to the second flotation.

The size separation may be accomplished through any size separation technique. In some processing variations, the size separation may include subjecting the mineral material feed to cyclone separation, with the first fraction or a portion thereof being recovered with cyclone overflow and the second fraction or a portion thereof being recovered with cyclone underflow. The first fraction and/or the first mineral material may have a weight average particle size ($P_{50}$ size), or may even have a $P_{80}$ size, of smaller than 30 microns, smaller than 25 microns, smaller than 20 microns, smaller than 15 microns or smaller than 10 microns. By $P_{80}$ size it is meant a size at which 80 weight percent of the particles are that size or smaller. The weight average particle size, or even the $P_{80}$ size, of the first fraction and/or the first mineral material may often be at least 3 microns. The second fraction and/or the second mineral material may have a weight average particle size, or even the $P_{80}$ size, of at least 50 microns, at least 75 microns or at least 100 microns. The weight average particle size, or even the $P_{80}$ size, of the second fraction and/or the second mineral material may often be smaller than 500 microns.

Either one or both of the first flotation processing and the second flotation processing may be performed according to the flotation processing described above having any feature described above or combination of any such features. For example, either one or both of the first flotation gas and the second flotation gas may comprise at least 5 volume percent, or more, carbon dioxide and either one or both of the first flotation processing and the second flotation processing may include conditioning of the first mineral material or the second mineral material, as the case may be, comprising treatment with a conditioning gas comprising at least 5 volume percent, or more, carbon dioxide. The method may include at least one of (i) the first flotation gas of the first flotation comprises at least 5 volume percent carbon dioxide; (ii) the second flotation gas of the second flotation comprises at least 5 volume percent carbon dioxide and (iii) conditioning prior to one or both of the first flotation and second flotation with a conditioning gas comprising at least 5 volume percent carbon dioxide. The first mineral material and/or the second mineral material may have any of the compositional or other properties described above or any combination of any such properties. When the mineral material feed to the size separation includes arsenian iron sulfides, the first fraction may contain a majority by weight of the arsenian iron sulfides from the mineral material feed.

The first flotation concentrate and the second flotation concentrate may be subjected to post-flotation processing including oxidative treatment to decompose sulfide minerals and expose precious metal in preparation for precious metal leaching. The first flotation concentrate and the second flotation concentrate may be combined and processed together, for example by combined biooxidation processing or combined pressure oxidation processing, which may involve acidic pressure oxidation or alkaline pressure oxidation. However, one significant benefit of size separation of a mineral material feed and separate flotation processing of different size fractions is that the separately prepared first flotation concentrate and the second flotation concentrate may be subjected to separate post-flotation processing, including separate oxidative treatment. In some processing variations, the second flotation concentrate may be subjected to post-flotation processing involving pressure oxidation (acidic or alkaline) and the first flotation concentrate may be subjected to different oxidative treatment. The different oxidative treatment of the first flotation concentrate may include separate pressure oxidation (alkaline or acidic), biooxidation or an atmospheric oxidation technique. Because of the small particle size of the first flotation concentrate, the first flotation concentrate may generally be more amenable to atmospheric oxidation processes, which may be acidic or alkaline. This is especially the case when the first flotation concentrate includes significant arsenian iron sulfides containing precious metal. In some preferred processing variations, the first flotation concentrate may be subjected to atmospheric oxidative treatment comprising contacting the first flotation concentrate with oxygen gas and a calcium-containing base material. The calcium containing base material may comprise lime or limestone. This processing may benefit from the presence of carbonate minerals that may be recovered in the first flotation concentrate during the first flotation processing. Chemistry of this atmospheric oxidation processing may be similar to that of the neutral Albion™ leaching, however the first flotation concentrate may not need to not be subjected to ultra-fine grinding as required by that process, because of the already-small particle size of the first flotation concentrate that results from the size separation.

Another advantage of size separation and separate flotation processing of the first and second flotation concentrates is that the second flotation concentrate may be filtered without complications caused by the presence of the smaller particles of the first flotation concentrate to prepare the second flotation concentrate for oxidative treatment. The smaller particles of the first flotation concentrate are more susceptible to filter plugging. The first flotation concentrate may be filtered separately with greater control over filter parameters and filter performance, or the first flotation concentrate may be subjected to oxidative treatment essentially in the absence of filtering the first flotation concentrate following the first flotation. Atmospheric oxidative treatment may work particularly well with processing the first flotation concentrate in the absence of filtration. The first flotation concentrate may have a weight average particular size as described for the first fraction from the size separation or the first mineral material as fed to the first flotation processing. Likewise, the second flotation concentrate may have a weight average particle size as described for the second fraction from the size separation or the second mineral material as fed to the second flotation processing.

After oxidative treatment, the residue of oxidative treatment of the first flotation concentrate and the second flotation concentrate may be subjected to precious metal leaching, which may be a combined leaching of both residues combined or separate leaching of each residue. Precious metal leaching may involve leaching with any precious metal lixiviant, which may be a lixiviant for gold, such as for example cyanide, thiosulfate or thiocyanate.

A second aspect involves a method for processing mineral material containing precious metal associated with one or more sulfide minerals and non-sulfide gangue minerals. The method comprises conditioning in preparation for flotation at an acidic pH, with the conditioning comprising treating a slurry comprising the mineral material with a conditioning gas comprising at least 5 volume percent carbon dioxide. During the treating the pH of the slurry is reduced by at least 0.5 pH unit to a pH that is less than pH 6.5

A number of feature refinements and additional features are applicable to this second aspect. These feature refinements and additional features may be used individually or in any combination within the subject matter of the second aspect or any other aspect of the disclosure. As such, each of the following features may be, but are not required to be, used within any other feature or combination of features of the second aspect or any other aspect.

As with the first aspect, the second aspect is particularly advantageous for processing mineral material in which the non-sulfide gangue minerals comprise acid-consuming carbonate. As such, the description below is provided in the context that the mineral material being processed includes acid-consuming carbonate, even though such is not required for all processing variations of this second aspect.

The conditioning of the second aspect may be according to the description of conditioning provided with respect to the first aspect or may have any feature or features described above in relation to conditioning with respect to the first aspect or any combination of any such features.

In addition to the aspects, embodiments and variations described above, further aspects, embodiments and variations will become apparent by reference to the drawings and by study of the following descriptions and examples.

DETAILED DESCRIPTION

Figure 1:
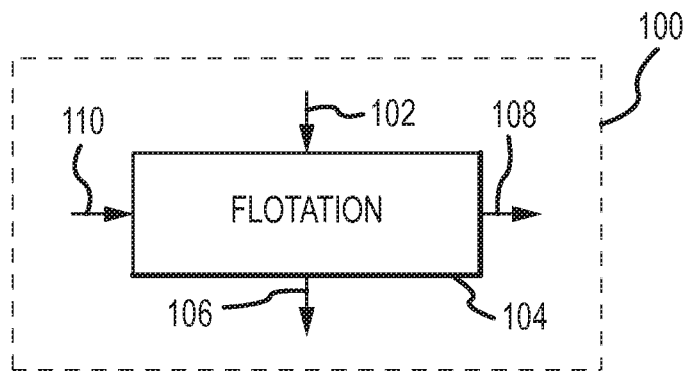
FIG. 1 is a generalized process block diagram illustrating some example processing variations including flotation.

FIG. 1 shows an illustration of an embodiment for flotation processing 100. As shown in FIG. 1, flotation processing 100 includes subjecting a mineral material 102 to flotation 104 using a flotation gas 110 to prepare a flotation concentrate 106 and a flotation tail 108. The flotation gas 110 may be or include carbon dioxide.

Figure 2:
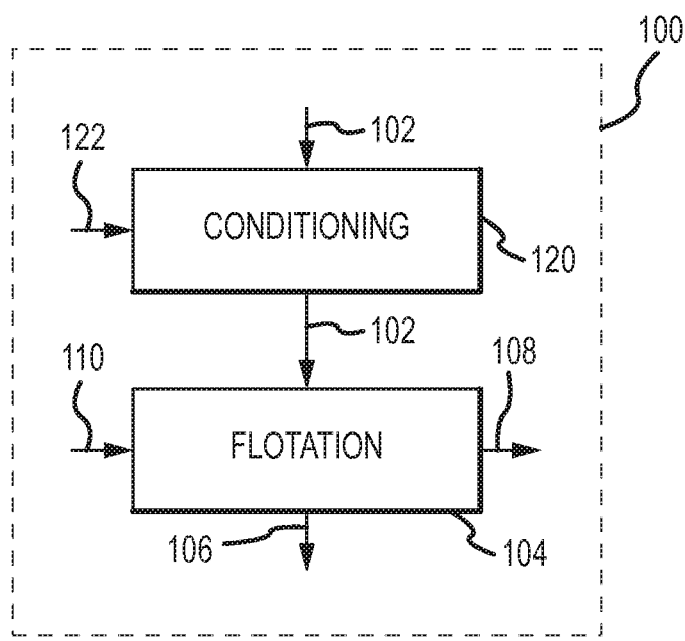
FIG. 2 is a generalized process block diagram illustrating some example processing variations including conditioning and flotation.

FIG. 2 shows a variation on the embodiment for flotation processing 100 shown in FIG. 1. As shown in FIG. 2, the flotation processing 100 includes the flotation 104 as described with FIG. 1. In the variation of FIG. 2, the mineral material 102 is subjected to conditioning 120 prior to the flotation 104. In the conditioning 120, the mineral material 102 is treated with a conditioning gas 122. One or both of the flotation gas 110 and the conditioning gas 122 is or includes carbon dioxide.

Figure 3:
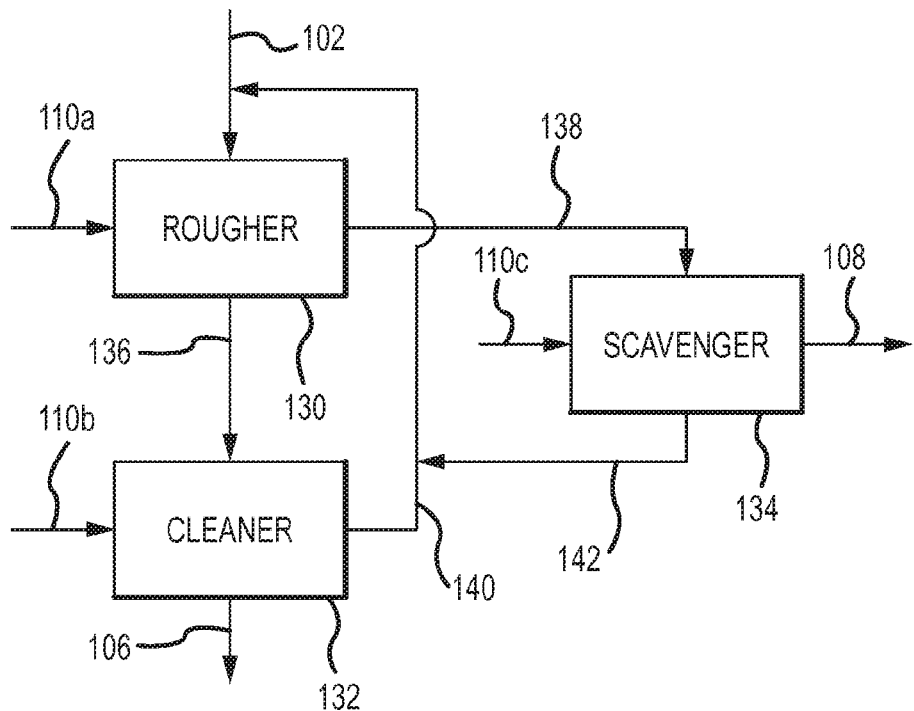
FIG. 3 is a generalized process block diagram illustrating some example processing variations including staged flotation.
Figure 4:
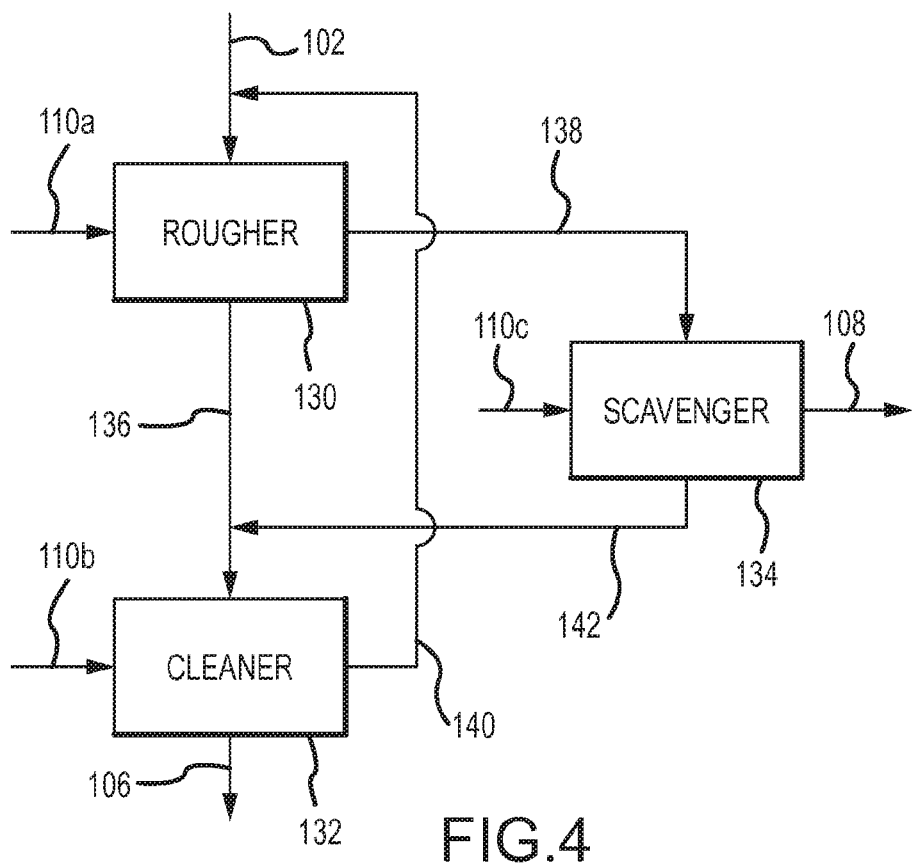
FIG. 4 is a generalized process block diagram illustrating some example processing variations including staged flotation.

FIGS. 3 and 4 show some examples of variations on the flotation 104 of FIGS. 1 and 2 including multiple flotation stages. As shown in FIG. 103, the flotation 104 may include a rougher flotation 130 stage, cleaner flotation 132 stage and scavenger flotation 134 stage. The mineral material 102 is first subjected to the rougher flotation 130 to prepare a rougher flotation concentrate 136 and a rougher flotation tail 138. The rougher flotation concentrate 136 is subjected to the cleaner flotation 132 to prepare the flotation concentrate 106 and a cleaner flotation tail 140. The rougher flotation tail 138 is subjected to the scavenger flotation 134 to prepare a scavenger flotation concentrate 142 and the flotation tail 108. The cleaner flotation tail 140 and the scavenger flotation concentrate 142 are recycled for processing through the rougher flotation 130 with the mineral material 102. A flotation gas 110a, 110b, 110c is used in each of the rougher flotation 130, cleaner flotation 132 and scavenger flotation 134. The flotation gases 110a, b, c may be the same or may be different compositions, and one or more of the flotation gases 110a, 110b, 110c may be or include carbon dioxide.

FIG. 4 shows a variation for the flotation 104 including a rougher flotation 130 stage, cleaner flotation 132 stage and scavenger flotation 134 stage similar to FIG. 3, except with slightly different processing flow among the flotation stages. As shown in FIG. 4, the scavenger flotation concentrate 142 is subjected to the cleaner flotation 132 together with the rougher flotation concentrate 136, rather than being recycled to the rougher flotation 130 as shown in FIG. 3.

Figure 5:
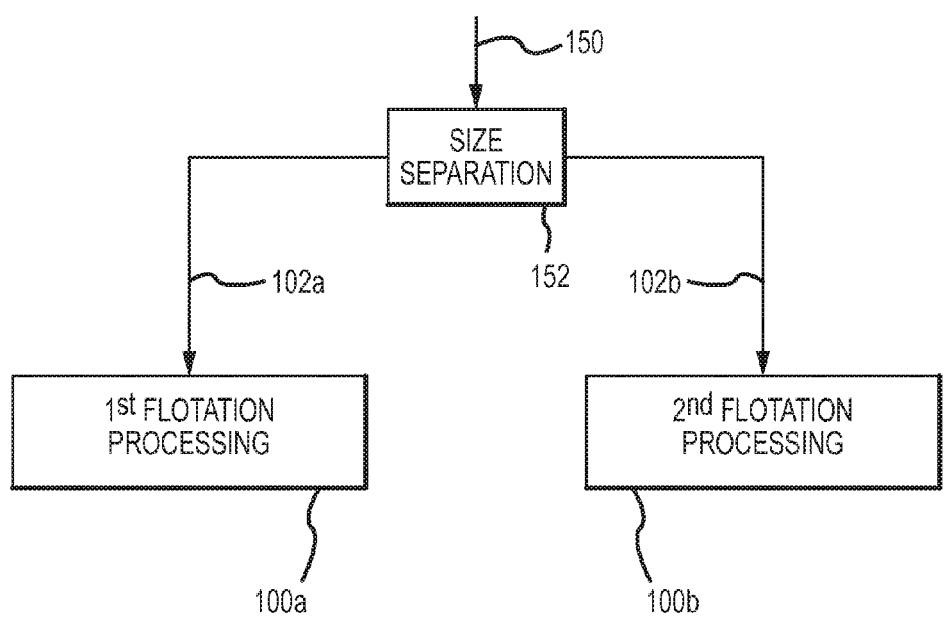
FIG. 5 is a generalized process block diagram illustrating some example processing variations including size separation prior to flotation processing.

Reference is now made to FIG. 5 to illustrate an example embodiment including size separation of a mineral material feed and separate flotation processing of different separated size fractions of mineral material. As shown in FIG. 5, a first mineral material 102a is subjected to first flotation processing 100a and a second mineral material 102b is subjected to second flotation processing 100b. Either one or both of the first flotation processing 100a and the second flotation processing 100b may for example be according to or including features of the flotation processing 100 as shown and described in relation to any of and FIGS. 1-4. The first mineral material 102a includes a first fraction from size separation 152 of a mineral material feed 150. The second mineral material 102b includes a second fraction from the size separation 152 of the mineral material feed 150. The mineral material feed 150 may be the result of prior comminution operations. The first fraction included in the mineral material 102a has a smaller weight average particle size than the second fraction included in the second mineral material 102b. The processing as shown in FIG. 5 provides significant flexibility to beneficially process the different size fractions for more optimal flotation processing of each fraction. Such processing also permits significant flexibility for post-flotation processing with oxidative treatment to prepare flotation concentrate for precious metal leaching.

Figure 6:
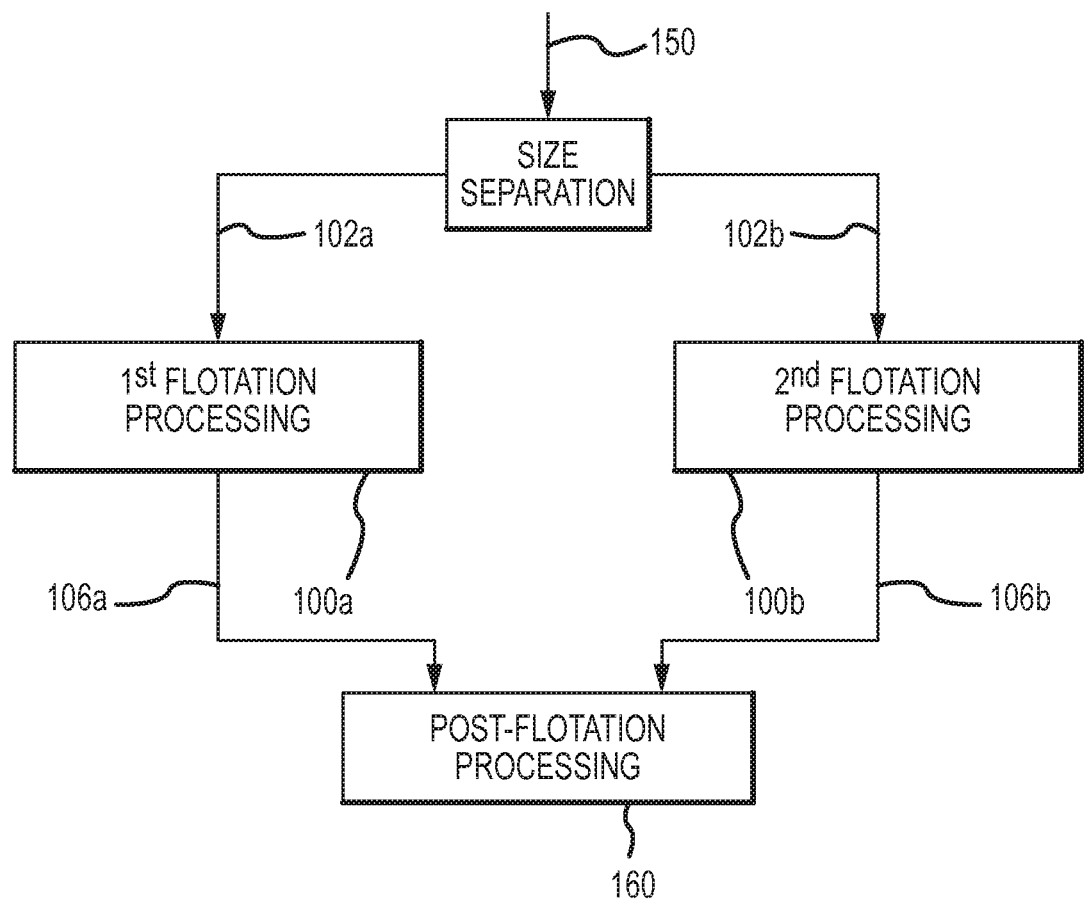
FIG. 6 is a generalized process block diagram illustrating some example processing variations including size separation prior to flotation processing and post-flotation processing of flotation concentrates.

FIG. 6 shows the same processing as shown in FIG. 5 including the size separation 152, first flotation processing 100a and second flotation processing 100b. However, in the processing of FIG. 6, a first flotation concentrate 106a from the first flotation processing 100a and a second flotation concentrate 106b from the second flotation processing 100b are subjected to post-flotation processing 160. During the post-flotation processing 160, at least a portion of the first flotation concentrate 106a and the second flotation concentrate 106b may be subjected to oxidative treatment to decompose sulfide minerals and expose precious metal to permit enhanced leach recovery of precious metal.

Figure 7:
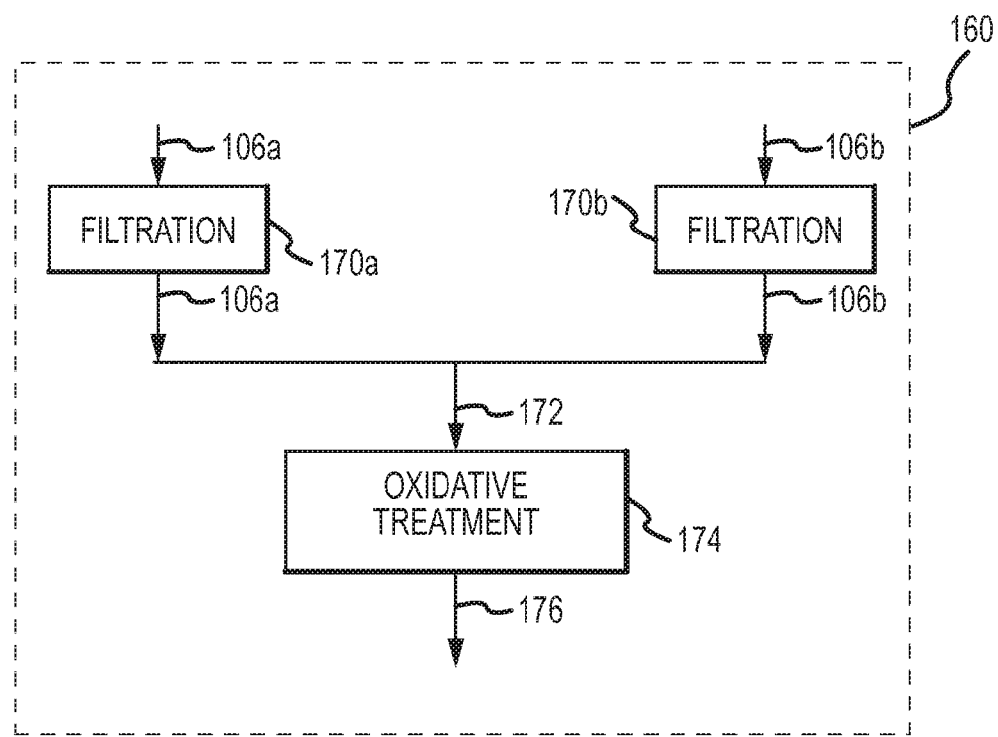
FIG. 7 is a generalized process block diagram illustrating some example processing variations including post-flotation processing including combined oxidative treatment of flotation concentrates.
Figure 8:
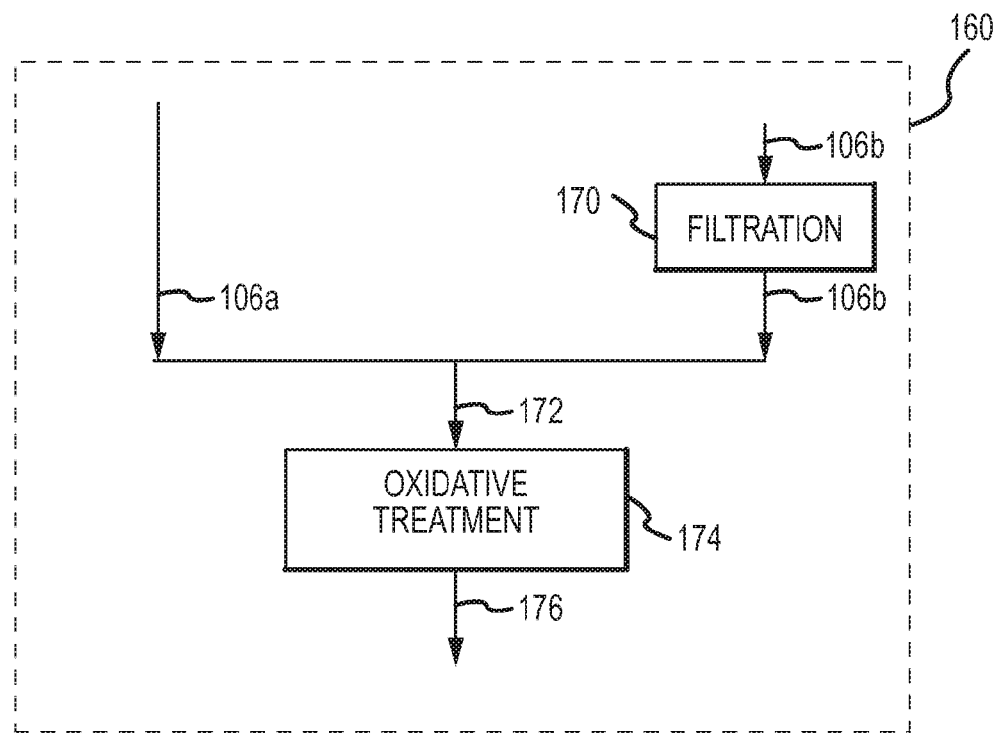
FIG. 8 is a generalized process block diagram illustrating some example processing variations including post-flotation processing including combined oxidative treatment of flotation concentrates.

FIGS. 7 and 8 show some example embodiments for the post-flotation processing 160 of FIG. 6 in which material from the first flotation concentrate 106a and the second flotation concentrate 106b may be processed together for oxidative treatment. As shown in FIG. 7, the post-flotation processing 160 may include filtration 170a of the first flotation concentrate 106a and separate filtration 170b of the second flotation concentrate 106b. Separate filtration of the concentrates permits more optimized filtration techniques to be used for the different particle sizes of the different concentrates. As a processing alternative to that shown in FIG. 7, the first flotation concentrate 106a and the second flotation concentrate 106b could be combined and subjected as a combined feed to a single filtration step. As shown in FIG. 7, the filtered first flotation concentrate 106a from the retentate of the filtration 170a is combined with the filtered second flotation concentrate 106b from retentate of the filtration 170b to form a combined concentrate 172. The combined concentrate 172 is subjected to oxidative treatment 174 to decompose sulfide minerals and expose precious metal to make the precious metal more amenable to recovery by leaching. Residual solids 176 from the oxidative treatment 174 may be further processed for gold recover, such as by leaching precious metal from residual solids 176 resulting from the oxidative treatment 174.

In the alternative processing embodiment shown in FIG. 8, the post-flotation processing 160 may include subjecting the second flotation concentrate 106b to filtration 170 and may include no filtration of the first flotation concentrate 106a before combining the first flotation concentrate 106a with the second flotation concentrate 106b to prepare the combined concentrate 172. The first flotation concentrate 106a, comprised of smaller-size particles than the second flotation concentrate 106b, is more difficult to filter without complications, although the combined concentrate 172 may have greater acidification requirements to an extent the oxidative treatment 174 involves acidic processing (e.g., acidic pressure oxidation, biooxidation).

Figure 9:
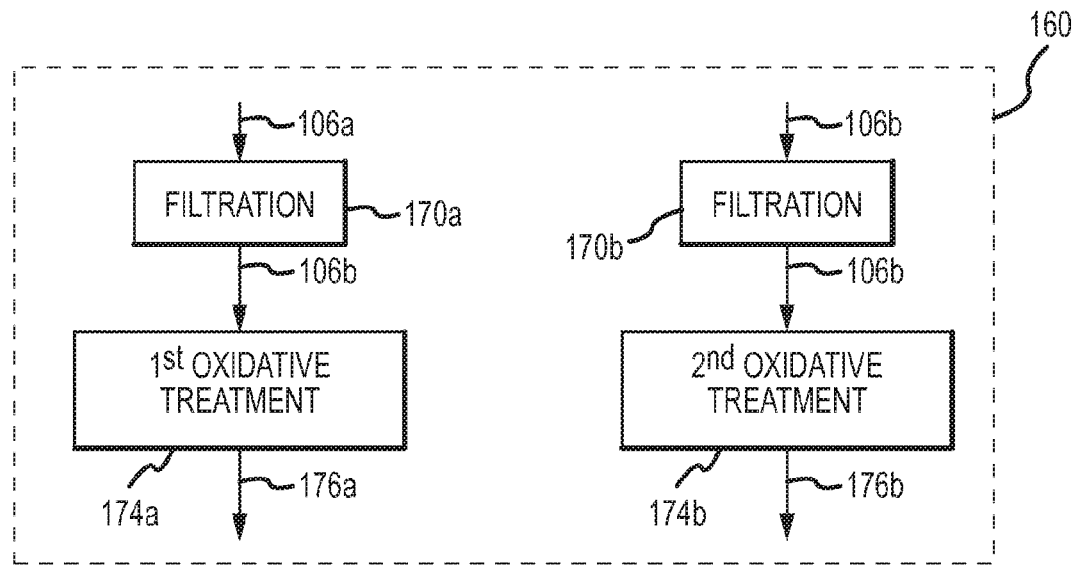
FIG. 9 is a generalized process block diagram illustrating some example processing variations including post-flotation processing including separate oxidative treatment of flotation concentrates.
Figure 10:
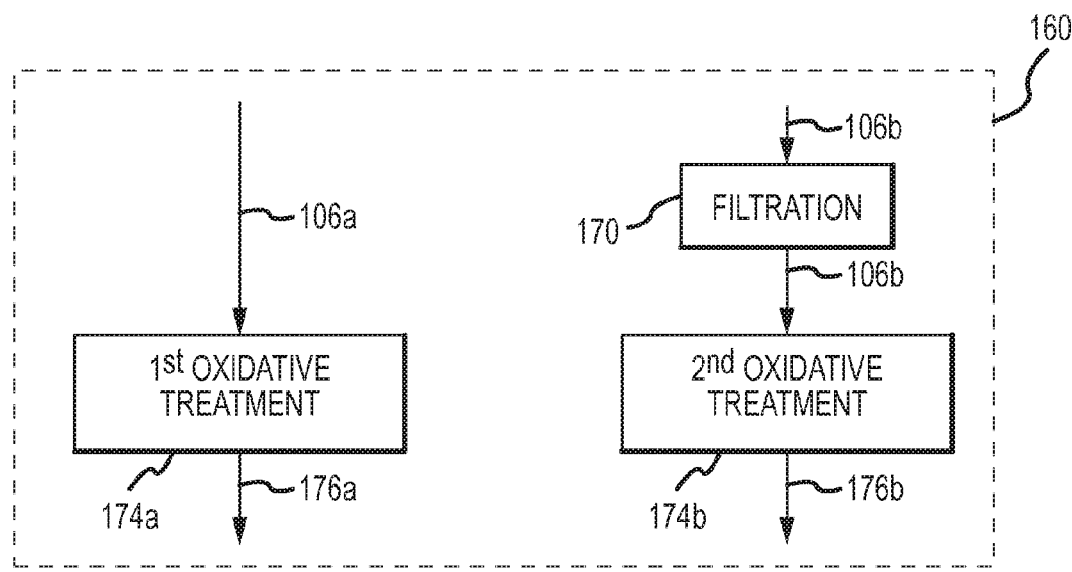
FIG. 10 is a generalized process block diagram illustrating some example processing variations including post-flotation processing including separate oxidative treatment of flotation concentrates.
Figure 11:
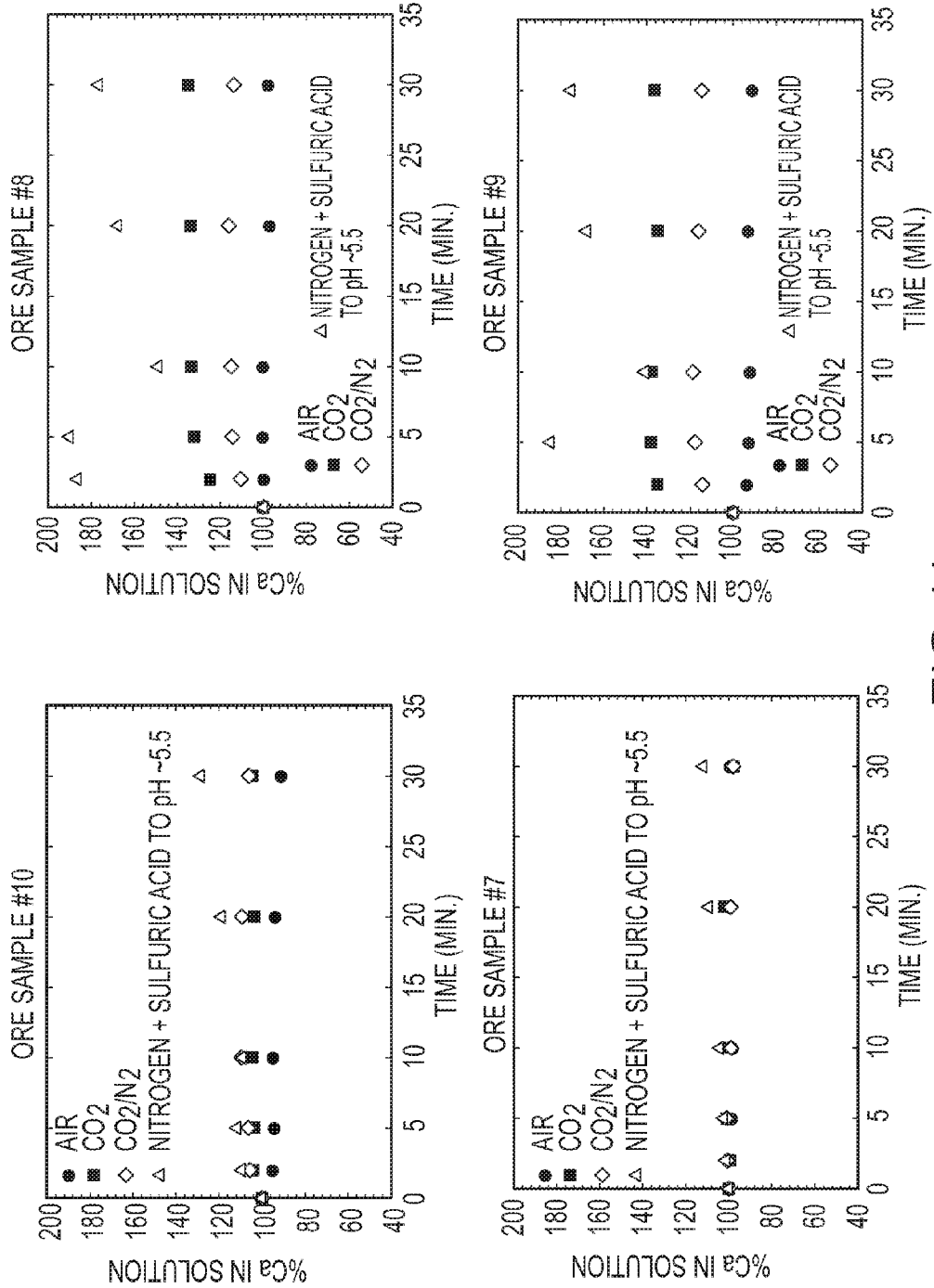
FIG. 11 shows plots of relative concentration as a percentage of initial concentration of calcium in solution in test slurries as a function of time for different ore samples during conditioning.
Figure 12:
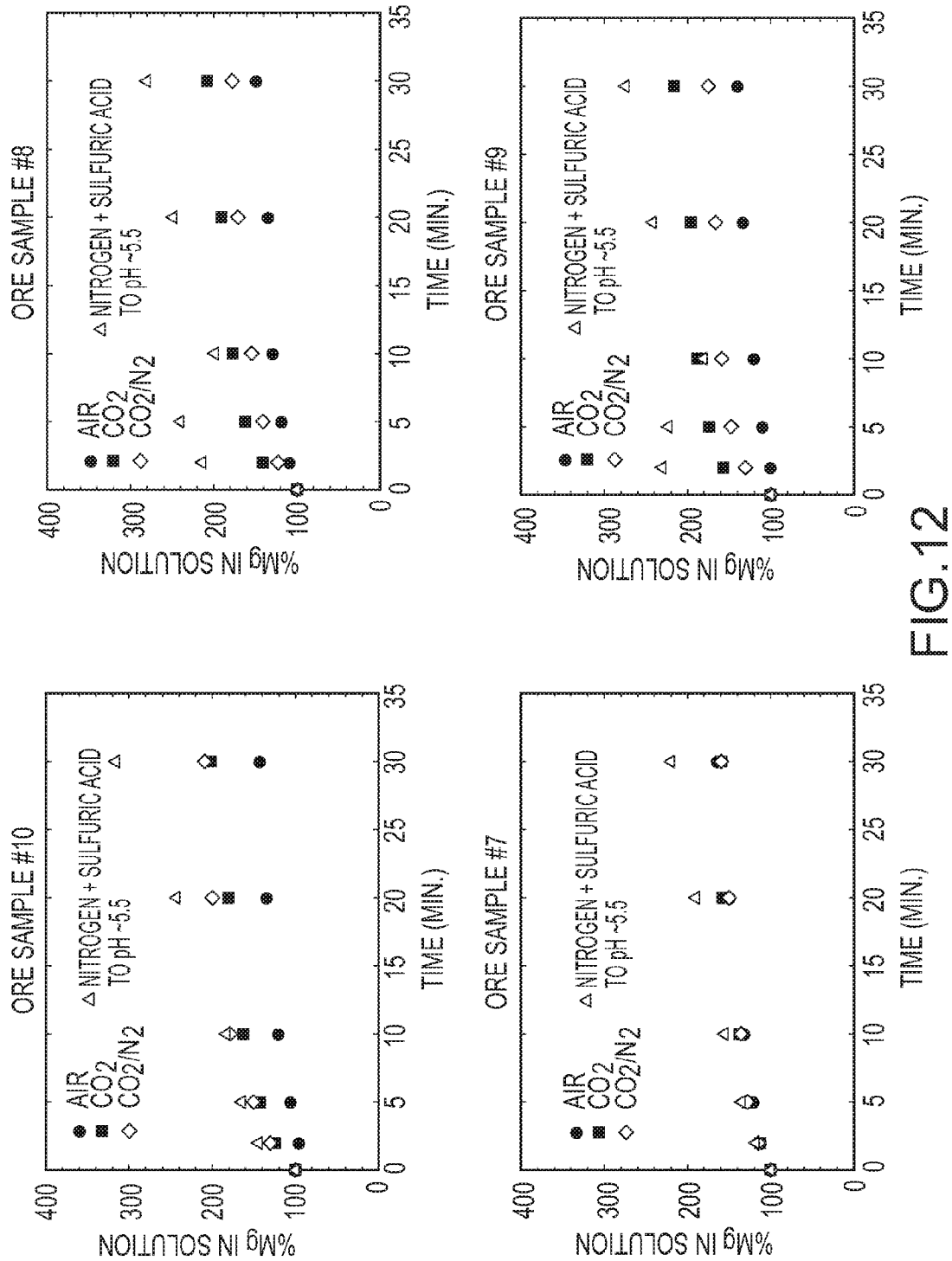
FIG. 12 shows plots of relative concentration as a percentage of initial concentration of magnesium in solution in test slurries as a function of time for different ore samples during conditioning.
Figure 13:
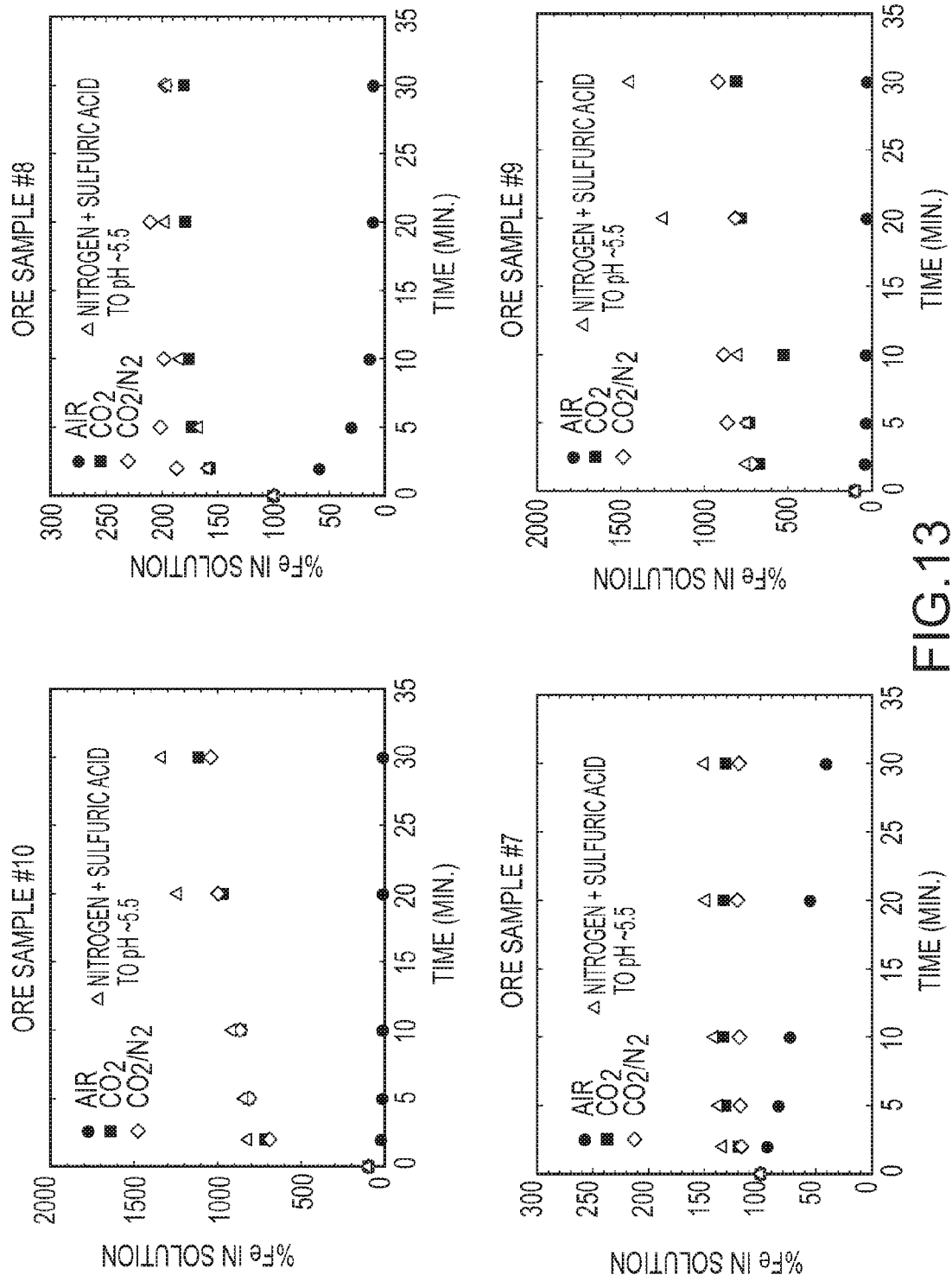
FIG. 13 shows plots of relative concentration as a percentage of initial concentration of dissolved iron in solution in test slurries as a function of time for different ore samples during conditioning.
Figure 14:
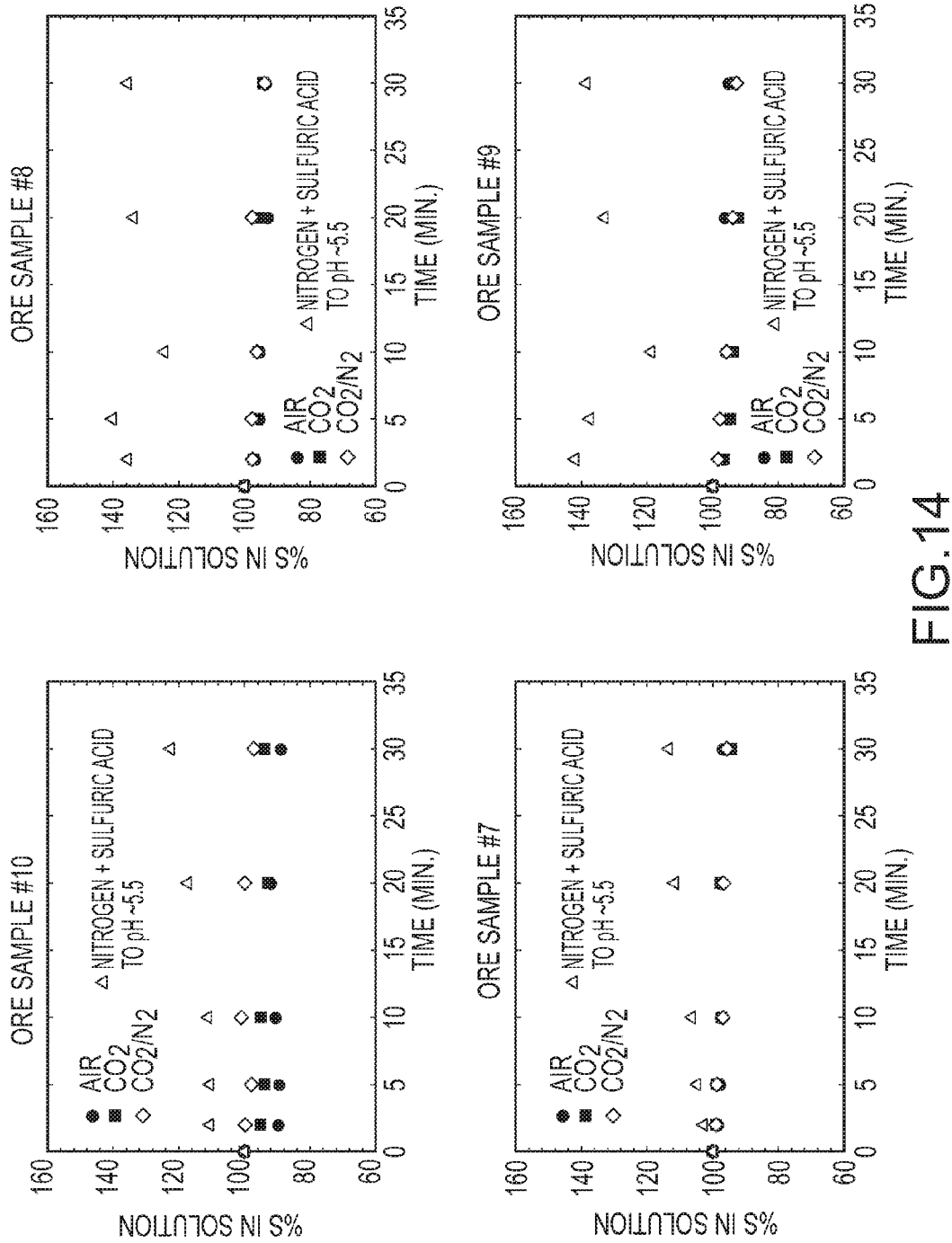
FIG. 14 shows plots of relative concentration as a percentage of initial concentration of sulfur in solution in solution in test slurries as a function of time for different ore samples during conditioning.

The post-flotation processing 160 shown in FIG. 6 may also involve separate oxidative treatment of the first flotation concentrate 106a and the second flotation concentrate 106b. FIGS. 9 and 10 show some example embodiments for the post-flotation processing 160 that may include separate oxidative treatments. As shown in FIG. 9, the post-flotation processing 160 includes subjecting the first flotation concentrate 106a to filtration 170a and the second flotation concentrate 106b to the filtration 170b. After the filtration 170a, the first flotation concentrate 106a is subjected to first oxidative treatment 174a to decompose sulfide minerals and prepare a first solid residue 176a that is more amenable to recovery of precious metal, such as by leaching. After the filtration 170b, the second flotation concentrate 106b is subjected to second oxidative treatment 174b to decompose sulfide minerals and prepare second residual solid residue 176b that is more amenable to precious metal recovery, such as by leaching. FIG. 10 shows the same processing as shown in FIG. 9 except that the second flotation concentrate 106b is subjected to filtration 170 and the first flotation concentrate 106a is not subjected to filtration. The first oxidative treatment 174a and the second oxidative treatment 174b may be the same or different oxidative techniques. For example, the first oxidative treatment 174a may be an atmospheric oxidation process due to the small particle size of the first flotation concentrate 106a, whereas the second oxidative treatment 174b may be a pressure oxidation process due to the larger particle size of the second flotation concentrate 106b.

Unless otherwise expressly stated percentages and concentrations are on a weight basis, except that gas composition percentages and concentrations are on a volume basis unless otherwise expressly stated.

The following examples further illustrate and describe various aspects, embodiments and features regarding the invention.

EXAMPLE 1

Three different samples of gold-bearing sulfide ore materials from the Carlin region of Nevada, USA having various carbonate contents are tested. Table 1 summarizes chemical analysis information for the samples. Table 2 provides a summary of mineralogical composition information on the ore samples estimated based on semi-quantitative x-ray diffraction (XRD) analysis. Table 3 summarizes mineralogical composition information on the ore samples estimated based on modal mineralogy analysis.

TABLE 1

Ore Sample Chemical Analysis

|  |  | Ore Sample #1 | Ore Sample #2 | Ore Sample #3 |
|---|---|---|---|---|
| As | ppm | 1132 | 1080 | 2411 |
| Sb | ppm | 57 | 41 | 82 |
| Se | ppm | <1 | <1 | <1 |
| Au | ppm | 2.07 | 2.55 | 2.85 |
| C Total | % | 0.07 | 0.96 | 1.15 |
| S Total | % | 1.59 | 1.88 | 2.37 |
| $CO_3$ | % | 0.25 | 4.7 | 5.5 |
| Sulfide S | % | 1.08 | 1.28 | 1.72 |
| Ag | ppm | <2 | <2 | <2 |
| Al | ppm | 24081 | 33811 | 31215 |
| Be | ppm | <2 | <2 | <2 |
| Ca | ppm | 1404 | 21485 | 28531 |
| Cd | ppm | 9 | 4 | 5 |
| Co | ppm | 10 | 9 | 7 |
| Cr | ppm | 51 | 60 | 39 |
| Cu | ppm | 85 | 74 | 104 |
| Fe | ppm | 21662 | 25115 | 25354 |
| K | ppm | 13659 | 15064 | 14663 |
| Mg | ppm | 1889 | 10470 | 12390 |
| Mn | ppm | 61 | 519 | 526 |
| Mo | ppm | 26 | 17 | 31 |
| Na | ppm | 229 | 194 | 111 |
| Ni | ppm | 81 | 96 | 118 |
| Pb | ppm | 17 | 51 | 21 |
| Sb | ppm | 78 | 65 | 96 |
| Se | ppm | <10 | <10 | <10 |
| Sr | ppm | 167 | 72 | 43 |
| Ti | ppm | 1472 | 1553 | 1332 |
| Tl | ppm | <20 | <20 | <20 |
| V | ppm | 776 | 374 | 705 |
| Zn | ppm | 564 | 1074 | 1233 |

TABLE 2

Semi-quantitative XRD

|  |  | Ore Sample #1 | Ore Sample #2 | Ore Sample #3 |
|---|---|---|---|---|
| Barite | % | 0.6 | 0.8 | 0.4 |
| Calcite | % |  |  | 0.9 |
| Dolomite | % |  | 8.4 | 8.7 |
| Jarosite | % |  |  | 0.4 |
| Gypsum | % | 0.8 | 1.5 |  |
| Illite | % | 12.4 | 10.5 |  |

TABLE 2-continued

Semi-quantitative XRD

|  |  | Ore Sample #1 | Ore Sample #2 | Ore Sample #3 |
|---|---|---|---|---|
| Kaolinite | % | 2.0 | 1.6 | 0.6 |
| Marcasite | % | 0.9 | 0.9 | 1.8 |
| Muscovite | % |  |  | 14.7 |
| Microcline | % | 2.2 | 1.4 |  |
| Pyrite | % | 1.8 | 2.3 | 2.0 |
| Quartz | % | 79.2 | 72.4 | 70.5 |

TABLE 3

Modal Mineralogy

|  |  | Ore Sample #1 | Ore Sample #2 | Ore Sample #3 |
|---|---|---|---|---|
| Alunite | % | 0.77 | 0.19 | 0.06 |
| Anhydrite | % | 0.0001 | 0.003 | 0.01 |
| Apatite | % | 0.05 | 0.20 | 0.22 |
| Arsenopyrite | % | 0.07 | 0.15 | 0.38 |
| Barite | % | 0.83 | 0.71 | 1.06 |
| Bismuthinite | % | 0.002 | 0.002 | 0.02 |
| Calcite | % | 0.03 | 0.24 | 0.45 |
| Chalcopyrite | % | 0.01 | 0.002 | 0.01 |
| Chlorite | % | 0.01 | 0.10 | 0.05 |
| Crandallite | % | 0.40 | 0.13 | 0.06 |
| Dolomite | % | 0.10 | 5.07 | 5.95 |
| FeOx | % | 0.49 | 0.18 | 0.11 |
| Illite | % | 3.60 | 7.62 | 5.18 |
| Ilmenite | % | 0.002 | 0.004 | 0.0005 |
| Iron | % | 0.13 | 0.06 | 0.23 |
| Jarosite | % | 0.05 | 0.04 | 0.03 |
| Kaolinite | % | 0.41 | 0.40 | 0.49 |
| Monazite | % | 0.0001 | 0.001 | 0.001 |
| Plagioclase | % | 0.43 | 0.77 | 0.54 |
| Phlogopite | % | 0.001 | 0.12 | 0.09 |
| Pyrite | % | 2.23 | 3.27 | 4.01 |
| Pyrite_As | % | 0.36 | 0.39 | 1.02 |
| Quartz | % | 88.14 | 78.78 | 78.98 |
| Rutile | % | 0.25 | 0.25 | 0.22 |
| Scorodite | % | 0.002 | 0.001 | 0.07 |
| Siderite | % | 1.52 | 1.19 | 0.53 |
| Sphalerite | % | 0.08 | 0.08 | 0.15 |
| Sphene | % | 0.00002 | 0.02 | 0.02 |
| Tennantite | % | 0.01 | 0.01 | 0.02 |

Ore samples #2 and #3 contain significant acid-consuming carbonate content in the form of dolomite or dolomite and calcite, whereas ore sample #1 does not contain a significant amount of carbonate minerals. The ore samples are subjected to laboratory flotation testing under various flotation conditions, with and without prior conditioning with a conditioning gas containing carbon dioxide. Different gas compositions used in flotation and/or conditioning in these and other tests in other examples provided below are summarized in Table 4.

TABLE 4

| Test Gas Composition | $CO_2$ % | Air % | $N_2$ % |
|---|---|---|---|
| G1 | — | 100 | — |
| G2 | — | — | 100 |
| G3 | 17 | 83 | — |
| G4 | 23 | 77 | — |
| G5 | 17 | — | 83 |
| G6 | 100 | — | — |
| G7 | 44 | — | 56 |
| G8 | 29 | — | 71 |

Each of ore samples #1 to #3 is comminuted to a targeted $P_{80}$ size of 105 microns (80 weight percent of particles smaller than 105 microns). Prior to the flotation, but after any conditioning with a conditioning gas, potassium amyl xanthate equivalent to 100 grams per tonne of ore sample is added as a collector and AERO® MX6205 (Cytec) equivalent to 50 grams per tonne of ore sample is added as a promoter. Flotation on each ore sample is conducted at an acidic pH. For tests in which 100 percent air is used as the flotation gas (gas composition G1), the slurry is acidified prior to flotation with the addition of sulfuric acid to try to attain a target pH of 5.5 and additional sulfuric acid is added as needed during flotation to try to maintain slurry pH around the target pH. For tests in which the flotation gas contains carbon dioxide, no acid is added to the slurry prior to or during flotation. Flotation is conducted in a laboratory flotation cell for about 16 minutes at a slurry density of about 25 percent solids. Some tests include conditioning with carbon dioxide gas (G6) prior to flotation. A summary of some tests and test results are presented in Tables 5, 6 and 7 for ore samples #1, #2 and #3, respectively.

TABLE 5

Ore Sample #1

| | Test Conditions | | | | Recovery In Flotation Concentrate | | |
|---|---|---|---|---|---|---|---|
| Test | Flotation | Conditioning | Acid pH Adjust | Other | Weight Recovery % | Au Recovery % | Sulfide Sulfur Recovery % |
| 1-1 | G1 | none | yes | | 12.47 | 51.3 | 86.8 |
| 1-5 | G1 | none | yes | tap water | 11.64 | 47.1 | 83.3 |
| 1-3 | G3 | none | no | | 13.06 | 54.0 | 81.4 |
| 1-2 | G3 | G6 10 minutes | no | | 12.30 | 53.6 | 89.4 |
| 1-7 | G3 | none | no | $N_2$ in grind | 10.35 | 55.3 | 94.5 |
| 1-6 | G5 | none | no | | 12.99 | 56.5 | 79.4 |
| 1-4 | G5 | G7 10 minutes | no | $N_2$ in grind | 13.80 | 62.1 | 87.7 |

TABLE 6

Ore Sample #2

| | Test Conditions | | | | Recovery In Flotation Concentrate | | |
|---|---|---|---|---|---|---|---|
| Test | Flotation | Conditioning | Acid pH Adjust | Other | Weight Recovery % | Au Recovery % | Sulfide Sulfur Recovery % |
| 2-1 | G1 | none | yes | | 14.01 | 39.0 | 82.7 |
| 2-5 | G1 | none | yes | tap water | 11.64 | 38.6 | 83.5 |
| 2-9 | G1 | none | no | natural pH | 12.95 | 35.5 | 74.9 |
| 2-14 | G2 | none | yes | $N_2$ in grind | 12.63 | 46.0 | 83.8 |
| 2-13 | G2 | G6 10 minutes | no | | 15.25 | 44.1 | 84.7 |
| 2-12 | G1 | G6 10 minutes | no | | 12.40 | 40.7 | 82.0 |
| 2-3 | G3 | none | no | | 13.46 | 37.8 | 82.5 |
| 2-8 | G3 | none | no | $N_2$ in grind | 12.60 | 44.0 | 95.1 |
| 2-10 | G3 | G6 2 minutes | no | | 11.20 | 36.1 | 76.3 |
| 2-11 | G3 | G6 5 minutes | no | | 13.87 | 42.8 | 81.8 |
| 2-2 | G3 | G6 10 minutes | no | | 14.58 | 44.9 | 88.4 |
| 2-6 | G3 | G6 10 minutes | no | | 13.90 | 44.8 | 93.3 |
| 2-15 | G3 | G6 20 minutes | no | | 13.73 | 46.8 | 85.8 |
| 2-7 | G5 | none | no | | 13.50 | 42.9 | 89.5 |
| 2-4 | G5 | G7 10 minutes | no | $N_2$ in grind | 13.65 | 51.7 | 90.5 |

TABLE 7

Ore Sample #3

| Test | Test Conditions | | | | Recovery In Flotation Concentrate | | |
|---|---|---|---|---|---|---|---|
| | Flotation | Conditioning | Acid pH Adjust | Other | Weight Recovery % | Au Recovery % | Sulfide Sulfur Recovery % |
| 3-1 | G1 | none | yes | | 12.50 | 34.7 | 85.1 |
| 3-5 | G1 | none | yes | tap water | 12.58 | 36.7 | 85.3 |
| 3-3 | G3 | none | no | | 13.83 | 36.7 | 84.0 |
| 3-7 | G3 | none | no | $N_2$ in grind | 13.58 | 41.7 | 86.3 |
| 3-2 | G3 | G6 10 minutes | no | | 14.12 | 40.6 | 83.2 |
| 3-6 | G5 | none | no | | 13.90 | 40.0 | 87.9 |
| 3-4 | G5 | G7 10 minutes | no | $N_2$ in grind | 16.46 | 53.3 | 90.0 |

Referring to Table 5 summarizing tests for ore sample #1, Tests 1-1 and 1-5 represent baseline air flotation tests with addition of sulfuric acid for pH control, with test 1-5 using tap water instead of process water that is used in other tests. In tests 1-3 and 1-2 somewhat higher gold recoveries in the concentrate result from using $CO_2$ in the flotation gas with or without prior conditioning with $CO_2$ gas. This modest recovery improvement is achieved without eliminating oxygen from the flotation gas. In test 1-7, the ore sample is comminuted in a nitrogen gas environment to help prevent oxidation of newly-exposed sulfide mineral grains. Relative to test 1-3, test 1-7 shows only a small improvement in gold recovery in the concentrate. A further small improvement in gold recovery in the concentrate is seen for test 1-6 when the flotation gas is a mixture of only carbon dioxide and nitrogen gas. A significantly higher gold recovery, however, is exhibited by test 1-4 in which the ore sample is comminuted in a nitrogen gas environment and the slurry is conditioned with a mixture of carbon dioxide and nitrogen gas prior to flotation with a mixture of carbon dioxide and nitrogen gas.

Ore samples #2 and #3 are much more difficult ores to process by flotation than ore sample #1. Not only do they contain significant concentrations of acid-consuming carbonate that impedes pH control in a desired acidic pH range by acid addition, but they also contain higher concentrations of arsenian iron sulfides that are difficult to float. Nitrogen gas flotation with pH control by addition of sulfuric acid has been a state-of-the-art technique for enhanced flotation of such ores.

Referring to results summarized in Table 6 for ore sample #2, tests 2-1 and 2-5 represent baseline tests using air flotation and test 2-14 represents a comparison with state-of-the-art nitrogen gas flotation, all of which include the conventional practice of adding sulfuric acid to attempt to achieve a desired acidic slurry pH of 5.5, which is significantly complicated by reaction of acid with of carbonate minerals. As seen in Table 6, nitrogen gas flotation (test 2-14) achieves a significantly higher recovery of gold in the concentrate than baseline air flotation (tests 2-1 and 2-5). For comparison purposes, test 2-9 floats the ore sample with air at a natural pH, with no pH control. As expected, gold recovery is higher with nitrogen gas flotation than with baseline air flotation tests, and air flotation without addition of sulfuric acid is lower than baseline air flotation with addition of sulfuric acid to attain an acidic pH for flotation.

Test 2-13 tests performance using nitrogen gas flotation but without addition of sulfuric acid to decompose acid-consuming carbonates to attain an acidic pH for flotation, but instead subjecting the slurry to conditioning with $CO_2$ gas prior to flotation. Surprisingly, gold recovery is almost as high as with the state-of-the-art nitrogen gas flotation test with sulfuric acid addition, but without the cost or complexity of high acid additions to decompose acid-consuming carbonates to achieve a desired acidic pH. Test 2-12 uses air flotation without sulfuric acid addition, but with prior $CO_2$ gas conditioning. Although gold recovery for test 2-12 is not as high as for test 2-13 using nitrogen gas for flotation, gold recovery is slightly higher than gold recovery in baseline air flotation tests with addition of sulfuric acid. This is surprising, since gold recovery is maintained without the expense and complication of large sulfuric acid additions to decompose carbonates to try to control slurry pH at a desired acidic pH level during flotation.

A number of tests are run on different processing combinations without sulfuric acid addition and using flotation gas made up of a mixture of carbon dioxide and air (17:83). In test 2-3, the flotation is performed without prior $CO_2$ gas conditioning and pH control during flotation is provided only by the $CO_2$ in the flotation gas. Notably, gold recovery in the concentrate is only slightly lower than for the baseline air flotation tests, but without the expense or complication of large sulfuric acid additions. Test 2-8 uses the same conditions as test 2-3, except that the ore is communicated in a nitrogen gas environment to reduce potential for newly-exposed sulfide mineral grain surfaces to oxidize before flotation. This resulted in a gold recovery almost as high as the baseline nitrogen gas flotation of test 2-14. Surprisingly, this is achieved without requiring large additions of sulfuric acid and without eliminating oxygen from the flotation gas, as the flotation gas in test 2-8 includes 83% air, equating to about 17% oxygen gas in the flotation gas mixture.

Tests 2-10, 2-11, 2-2, 2-6 and 2-15 all include $CO_2$ gas conditioning for different lengths of time prior to flotation with the mixture of $CO_2$ and air for the flotation gas. Significant enhancement in gold recovery in the concentrate is observed relative to baseline air flotation tests for 5, 10 and 20 minutes of conditioning, with gold recoveries generally comparable with the baseline nitrogen gas flotation of test 2-14. This is surprising given that test 2-15 does not include the expense or complication of large sulfuric acid additions or elimination of oxygen gas from the flotation gas.

Tests 2-7 and 2-4 use a mixture of carbon dioxide and nitrogen gas (17:83) as a flotation gas, with and without prior conditioning with $CO_2$ gas, and without sulfuric acid addition. Control of pH is provided only by carbon dioxide in the conditioning and/or flotation gas. As seen in a comparison of test 2-7 with test 2-3, use of this flotation gas mixture has a positive effect on gold recovery relative to use of a mixture of $CO_2$ and air. Particularly surprising are the results for test 2-4 including conditioning with a mixture of $CO_2$ and nitrogen gas prior to flotation with a mixture of $CO_2$ and nitrogen gas, which show significantly higher gold recovery in the concentrate than with the state-of-the-art nitrogen gas flotation conditions of test 2-14.

Referring to results summarized in Table 7 for ore sample #3, flotation with a mixture of $CO_2$ and air (17:83) without prior conditioning (test 3-3) resulted in comparable or slightly better gold recovery than baseline air flotation conditions with sulfuric acid addition to decompose acid-consuming carbonates and adjust pH (tests 3-1 and 3-5). Combining use of the mixture of $CO_2$ and air for the flotation gas with either prior comminution in nitrogen gas (test 3-7), prior $CO_2$ gas conditioning (test 3-2) or use of a mixture of $CO_2$ and $N_2$ (17:83) as the flotation gas without prior conditioning (test 3-6) results in significant improvement in gold recovery in the concentrate relative to baseline air flotation tests, and without the cost or complexity of large additions of sulfuric acid. Particularly surprising is the very high level of gold recovery in the concentrate achieved using a mixture of $CO_2$ and $N_2$ for the flotation gas with prior conditioning with a mixture of $CO_2$ and nitrogen gas conditioning (test 3-4), again without the cost or complexity of large additions of sulfuric acid required to decompose acid-consuming carbonates for flotation at a desired acidic pH.

EXAMPLE 2

Samples are of gold-bearing sulfide ore materials obtained from slurry samples taken from a conventional air flotation operation in Nevada, USA. Tables 8-10 summarize chemical analysis information for the ore samples, designated herein as ore samples #4, #5 and #6. Tables 8-10 also show particle size distribution information and chemical analysis information for different particle size ranges. Table 11 summarizes mineralogical composition information for the ore samples estimated by model mineralogy analysis. Ore sample #4 is a higher-quality ore sample having negligible carbonate content that is relatively amenable to processing by conventional air flotation to prepare a sulfide concentrate enriched in gold. Ore samples #5 and #6 are more difficult ores that each contains significant acid-consuming carbonate, mostly present in the form of dolomite, and contain more arsenian iron sulfide content than sample #4.

TABLE 8

Ore Sample #4

| Particle Size | Mesh | Content By Particle Size (ppm or %) | | | | | Component Weight Distribution By Particle Size (%) | | | |
|---|---|---|---|---|---|---|---|---|---|---|
| | | 200+ | 200 × 325 | 325 × 500 | -500 | Total | 200+ | 200 × 325 | 325 × 500 | -500 |
| Weight Distribution | % | 35.8 | 16.1 | 10.0 | 38.1 | 100.0 | | | | |
| As | ppm | 727 | 843 | 1009 | 1755 | 1166 | 22.3 | 11.7 | 8.6 | 57.4 |
| Sb | ppm | 32 | 42 | 51 | 96 | 60 | 19.1 | 11.3 | 8.5 | 61.1 |
| Se | ppm | <1 | <1 | <1 | <1 | <1 | | | | |
| Au | ppm | 1.60 | 1.71 | 1.79 | 3.73 | 2.45 | 23.4 | 11.3 | 7.3 | 58.0 |
| C Total | % | 0.06 | 0.1 | 0.09 | 0.11 | 0.09 | 24.3 | 18.2 | 10.1 | 47.4 |
| S Total | % | 1.04 | 1.91 | 2.43 | 2.09 | 1.72 | 21.7 | 17.9 | 14.1 | 46.3 |
| $CO_3$ | % | 0.00 | 0.2 | 0.20 | 0.00 | 0.1 | 0.0 | 61.8 | 38.2 | 0.0 |
| Sulfide S | % | 0.73 | 1.39 | 1.73 | 1.16 | 1.10 | 23.8 | 20.4 | 15.7 | 40.2 |
| Ag | ppm | 2.4 | 2.4 | 2.5 | 3.5 | 2.8 | | | | |
| Al | ppm | 23024 | 20943 | 19002 | 37641 | 27859 | 29.6 | 12.1 | 6.8 | 51.5 |
| Be | ppm | <2 | <2 | <2 | <2 | <2 | | | | |
| Ca | ppm | 968 | 1110 | 1221 | 1690 | 1291 | 26.8 | 13.9 | 9.4 | 49.9 |
| Cd | ppm | 5 | 6 | 8 | 13 | 9 | 21.0 | 11.4 | 9.4 | 58.2 |
| Co | ppm | 5 | 7 | 8 | 12 | 8 | 21.6 | 13.6 | 9.6 | 55.2 |
| Cr | ppm | 15 | 23 | 22 | 42 | 27 | 19.7 | 13.6 | 8.0 | 58.7 |
| Cu | ppm | 50 | 65 | 84 | 119 | 82 | 21.8 | 12.8 | 10.2 | 55.2 |
| Fe | ppm | 14551 | 25514 | 29234 | 33782 | 25111 | 20.7 | 16.4 | 11.6 | 51.3 |
| K | ppm | 10439 | 8919 | 7841 | 20687 | 13841 | 27.0 | 10.4 | 5.6 | 57.0 |
| Mg | ppm | 1424 | 1260 | 1202 | 2181 | 1664 | 30.6 | 12.2 | 7.2 | 50.0 |
| Mn | ppm | 32 | 64 | 68 | 46 | 46 | 24.9 | 22.4 | 14.7 | 38.0 |
| Mo | ppm | 22 | 23 | 23 | 39 | 29 | 27.4 | 12.9 | 8.0 | 51.7 |
| Na | ppm | 200 | 217 | 248 | 1600 | 741 | 9.7 | 4.7 | 3.3 | 82.3 |
| Ni | ppm | 58 | 76 | 86 | 91 | 76 | 27.2 | 16.1 | 11.2 | 45.5 |
| Pb | ppm | 13 | 18 | 23 | 117 | 54 | 8.5 | 5.3 | 4.2 | 81.9 |
| Sb | ppm | 43 | 55 | 64 | 100 | 69 | 22.4 | 12.9 | 9.3 | 55.4 |
| Se | ppm | <10 | <10 | <10 | <10 | <10 | | | | |
| Sr | ppm | 108 | 117 | 115 | 268 | 171 | 22.6 | 11.0 | 6.7 | 59.7 |
| Ti | ppm | 1258 | 1302 | 1320 | 1559 | 1386 | 32.5 | 15.1 | 9.5 | 42.9 |
| Tl | ppm | <20 | <20 | <20 | <20 | <20 | | | | |
| V | ppm | 692 | 635 | 610 | 1081 | 823 | 30.1 | 12.4 | 7.4 | 50.1 |
| Zn | ppm | 457 | 483 | 563 | 849 | 621 | 26.3 | 12.5 | 9.0 | 52.1 |

TABLE 9

Ore Sample #5

| Particle Size | Mesh | Content By Particle Size (ppm or %) | | | | | Component Weight Distribution By Particle Size (%) | | | |
|---|---|---|---|---|---|---|---|---|---|---|
| | | 200+ | 200 × 325 | 325 × 500 | -500 | Total | 200+ | 200 × 325 | 325 × 500 | -500 |
| Weight Distribution | % | 31.1 | 27.1 | 20.4 | 21.4 | 100.0 | | | | |
| As | ppm | 1531 | 2007 | 2899 | 2618 | 2172 | 21.9 | 25.1 | 27.2 | 25.8 |
| Sb | ppm | 25 | 34 | 42 | 55 | 37 | 20.8 | 24.7 | 23.0 | 31.5 |
| Se | ppm | <1 | <1 | <1 | <1 | | | | | |
| Au | ppm | 1.82 | 2.19 | 2.48 | 4.10 | 2.54 | 22.2 | 23.4 | 19.9 | 34.5 |
| C Total | % | 0.7 | 0.8 | 0.89 | 0.96 | 0.82 | 26.5 | 26.4 | 22.1 | 25.0 |
| S Total | % | 1.32 | 2.45 | 3.03 | 2.06 | 2.13 | 19.2 | 31.1 | 29.0 | 20.7 |
| CO$_3$ | % | 0.00 | 3.9 | 4.25 | 4.40 | 2.9 | 0.0 | 36.6 | 30.4 | 33.0 |
| Sulfide S | % | 0.94 | 1.76 | 2.34 | 1.23 | 1.51 | 19.4 | 31.6 | 31.6 | 17.4 |
| Ag | ppm | <2 | <2 | <2 | 2.1 | | | | | |
| Al | ppm | 22314 | 21182 | 21662 | 44846 | 26695 | 26.0 | 21.5 | 16.6 | 35.9 |
| Be | ppm | <2 | <2 | <2 | <2 | | | | | |
| Ca | ppm | 17196 | 20238 | 22135 | 21639 | 19979 | 26.8 | 27.5 | 22.6 | 23.2 |
| Cd | ppm | 5 | 5 | 5 | 9 | 6 | 26.6 | 23.2 | 17.4 | 32.9 |
| Co | ppm | 5 | 8 | 11 | 11 | 8 | 18.7 | 26.1 | 27.0 | 28.3 |
| Cr | ppm | 26 | 29 | 28 | 46 | 32 | 25.7 | 25.0 | 18.1 | 31.2 |
| Cu | ppm | 53 | 95 | 110 | 127 | 92 | 17.9 | 28.0 | 24.4 | 29.6 |
| Fe | ppm | 18158 | 27328 | 33577 | 32435 | 26844 | 21.0 | 27.6 | 25.5 | 25.9 |
| K | ppm | 10432 | 9844 | 10133 | 21570 | 12594 | 25.8 | 21.2 | 16.4 | 36.6 |
| Mg | ppm | 7096 | 7848 | 8803 | 11322 | 8552 | 25.8 | 24.9 | 21.0 | 28.3 |
| Mn | ppm | 282 | 352 | 414 | 507 | 376 | 23.3 | 25.4 | 22.5 | 28.8 |
| Mo | ppm | 35 | 32 | 30 | 39 | 34 | 32.0 | 25.5 | 18.0 | 24.5 |
| Na | ppm | 266 | 353 | 393 | 368 | 337 | 24.5 | 28.4 | 23.8 | 23.3 |
| Ni | ppm | 99 | 111 | 129 | 162 | 122 | 25.3 | 24.7 | 21.6 | 28.4 |
| Pb | ppm | 15 | 19 | 25 | 64 | 29 | 16.3 | 18.0 | 17.8 | 47.9 |
| Sb | ppm | 32 | 42 | 52 | 63 | 45 | 21.9 | 25.1 | 23.4 | 29.7 |
| Se | ppm | <10 | <10 | <10 | <10 | | | | | |
| Sr | ppm | 41 | 46 | 50 | 94 | 56 | 23.0 | 22.5 | 18.4 | 36.2 |
| Ti | ppm | 1069 | 1227 | 1404 | 1784 | 1333 | 24.9 | 25.0 | 21.5 | 28.6 |
| Tl | ppm | <20 | <20 | <20 | <20 | | | | | |
| V | ppm | 1006 | 856 | 761 | 1227 | 963 | 32.5 | 24.1 | 16.1 | 27.3 |
| Zn | ppm | 853 | 875 | 942 | 1418 | 998 | 26.6 | 23.8 | 19.3 | 30.4 |

TABLE 10

Ore Sample #6

| Particle Size | Mesh | Content By Particle Size (ppm or %) | | | | | Component Weight Distribution By Particle Size (%) | | | |
|---|---|---|---|---|---|---|---|---|---|---|
| | | 200+ | 200 × 325 | 325 × 500 | -500 | Total | 200+ | 200 × 325 | 325 × 500 | -500 |
| Weight Distribution | % | 41.3 | 10.8 | 7.6 | 40.3 | 100.0 | | | | |
| As | ppm | 1317 | 1741 | 2455 | 2404 | 1887 | 28.8 | 10.0 | 9.9 | 51.3 |
| Sb | ppm | 34 | 50 | 57 | 80 | 56 | 24.8 | 9.7 | 7.8 | 57.7 |
| Se | ppm | <1 | <1 | <1 | <1 | <1 | | | | |
| Au | ppm | 1.81 | 2.06 | 2.20 | 4.11 | 2.79 | 26.7 | 8.0 | 6.0 | 59.3 |
| C Total | % | 0.88 | 0.97 | 1.1 | 1.22 | 1.04 | 34.8 | 10.1 | 8.0 | 47.1 |
| S Total | % | 1.31 | 2.41 | 2.94 | 2.11 | 1.88 | 28.8 | 13.9 | 11.9 | 45.3 |
| CO$_3$ | % | 0.0 | 3.9 | 5.1 | 5.65 | 3.1 | 0.0 | 13.7 | 12.5 | 73.8 |
| Sulfide S | % | 0.98 | 1.71 | 2.17 | 1.28 | 1.27 | 31.8 | 14.6 | 13.0 | 40.6 |
| Ag | ppm | <2 | <2 | <2 | <2 | <2 | | | | |
| Al | ppm | 22777 | 20659 | 19309 | 48122 | 32499 | 28.9 | 6.9 | 4.5 | 59.7 |
| Be | ppm | <2 | 0 | 0 | <2 | <2 | | | | |
| Ca | ppm | 20236 | 22199 | 24861 | 25903 | 23083 | 36.2 | 10.4 | 8.2 | 45.2 |
| Cd | ppm | 4 | 5 | 6 | 9 | 6 | 28.7 | 8.4 | 6.6 | 56.3 |
| Co | ppm | 5 | 7 | 10 | 10 | 7 | 26.0 | 10.5 | 9.7 | 53.8 |
| Cr | ppm | 20 | 19 | 20 | 38 | 27 | 30.1 | 7.6 | 5.7 | 56.6 |
| Cu | ppm | 45 | 51 | 59 | 106 | 71 | 26.2 | 7.8 | 6.2 | 59.8 |
| Fe | ppm | 18110 | 29116 | 34154 | 30540 | 25529 | 29.3 | 12.3 | 10.2 | 48.2 |
| K | ppm | 10318 | 9183 | 8364 | 21004 | 14353 | 29.7 | 6.9 | 4.4 | 59.0 |
| Mg | ppm | 9146 | 10215 | 10994 | 13636 | 11212 | 33.7 | 9.9 | 7.4 | 49.0 |
| Mn | ppm | 381 | 463 | 513 | 625 | 498 | 31.6 | 10.1 | 7.8 | 50.6 |
| Mo | ppm | 26 | 24 | 22 | 33 | 28 | 37.6 | 9.3 | 6.0 | 47.0 |

TABLE 10-continued

Ore Sample #6

| Particle Size | Mesh | Content By Particle Size (ppm or %) | | | | | Component Weight Distribution By Particle Size (%) | | | |
|---|---|---|---|---|---|---|---|---|---|---|
| | | 200+ | 200 × 325 | 325 × 500 | −500 | Total | 200+ | 200 × 325 | 325 × 500 | −500 |
| Na | ppm | 145 | 277 | 136 | 245 | 199 | 30.1 | 15.1 | 5.2 | 49.7 |
| Ni | ppm | 91 | 111 | 125 | 151 | 120 | 31.2 | 10.0 | 7.9 | 50.8 |
| Pb | ppm | 13 | 14 | 18 | 32 | 21 | 25.2 | 7.2 | 6.3 | 61.3 |
| Sb | ppm | 50 | 65 | 70 | 90 | 69 | 29.8 | 10.2 | 7.7 | 52.3 |
| Se | ppm | <10 | <10 | <10 | <10 | <10 | | | | |
| Sr | ppm | 36 | 42 | 44 | 110 | 67 | 22.0 | 6.8 | 5.0 | 66.2 |
| Ti | ppm | 1110 | 1193 | 1284 | 1557 | 1312 | 34.9 | 9.8 | 7.4 | 47.8 |
| Tl | ppm | <20 | <20 | <20 | <20 | <20 | | | | |
| V | ppm | 717 | 620 | 550 | 936 | 782 | 37.8 | 8.6 | 5.3 | 48.2 |
| Zn | ppm | 872 | 1018 | 1144 | 1821 | 1291 | 27.9 | 8.5 | 6.7 | 56.9 |

TABLE 11

Modal Mineralogy

| | | Ore Sample #4 | Ore Sample #5 | Ore Sample #6 |
|---|---|---|---|---|
| Alunite | % | 0.76 | 0.08 | 0.14 |
| Anhydrite | % | 0.003 | 0.003 | 0.001 |
| Apatite | % | 0.13 | 0.19 | 0.17 |
| Arsenopyrite | % | 0.04 | 0.34 | 0.25 |
| Barite | % | 0.80 | 0.97 | 1.42 |
| Bismuthinite | % | 0.002 | 0.01 | 0.001 |
| Calcite | % | 0.08 | 0.30 | 0.05 |
| Chalcopyrite | % | 0.01 | 0.01 | 0.01 |
| Chlorite | % | 0.11 | 0.10 | 0.02 |
| Crandallite | % | 0.56 | 0.14 | 0.09 |
| Dolomite | % | 0.01 | 3.63 | 5.85 |
| FeOx | % | 0.62 | 0.10 | 0.22 |
| Illite | % | 3.22 | 5.31 | 6.67 |
| Ilmenite | % | 0.01 | 0.001 | 0.001 |
| Iron | % | 0.03 | 0.01 | 0.03 |
| Jarosite | % | 0.05 | 0.02 | 0.01 |
| Kaolinite | % | 0.48 | 0.42 | 0.27 |
| Monazite | % | | 0.001 | 0.003 |
| Plagioclase | % | 0.82 | 0.84 | 0.69 |
| Phlogopite | % | 0.05 | 0.11 | 0.04 |
| Pyrite | % | 2.32 | 2.87 | 2.98 |
| Pyrite_As | % | 0.29 | 0.70 | 0.62 |
| Quartz | % | 87.90 | 82.54 | 79.13 |
| Rutile | % | 0.24 | 0.20 | 0.29 |
| Scorodite | % | 0.01 | 0.005 | 0.0001 |
| Siderite | % | 1.35 | 0.95 | 0.82 |
| Sphalerite | % | 0.09 | 0.09 | 0.19 |
| Sphene | % | 0.00004 | 0.03 | 0.004 |
| Tennantite | % | 0.003 | 0.01 | 0.01 |
| Zircon | % | 0.01 | 0.02 | 0.03 |

Each ore sample is subjected to cyclone separation to separate the ore sample into a smaller particle-size fraction (cyclone overflow) and a larger particle-size fraction (cyclone underflow) for separate flotation testing on the different fractions. Flotation tests are also run on the whole ore samples for comparison. Tables 12-14 summarize particle size information for the whole ore sample and the separated overflow and underflow fractions from the cyclone separation. Flotation tests are performed in a laboratory flotation cell in a slurry with a solids density generally of about 30-35 weight percent solids for the underflow flotation tests and about 15-20 weight percent solids for the overflow flotation tests, with some tests including prior conditioning by sparging the slurry with a conditioning gas containing carbon dioxide. Flotation is conducted for about 16 minutes. Test results are summarized in Tables 15-20. In Tables 15-20 cyclone underflow fractions are designated "U/F" and cyclone overflow fractions are designated "O/F". Testing also includes cyanide leaching of gold from flotation tails to evaluate the total amount of gold that is recoverable either in the flotation concentrate or through cyanide leaching of the flotation tails.

TABLE 12

Ore Sample #4
Cyclone Size Separation

| | Ore Sample Feed | Underflow | Overflow |
|---|---|---|---|
| Weight Distribution % | 100.0 | 62.8 | 37.2 |
| $P_{80}$ Size microns | 180 | 216 | 21 |
| | | (calculated) | |
| Gold Distribution % | 100.0 | 49.5 | 50.5 |

TABLE 13

Ore Sample #5
Cyclone Size Separation

| | Ore Sample Feed | Underflow | Overflow |
|---|---|---|---|
| Weight Distribution % | 100.0 | 67.9 | 32.1 |
| $P_{80}$ Size microns | 119 | 135 | 10 |
| | | (calculated) | |
| Gold Distribution % | 100.0 | 54.0 | 46.0 |

TABLE 14

Ore Sample #6
Cyclone Size Separation

| | Ore Sample Feed | Underflow | Overflow |
|---|---|---|---|
| Weight Distribution % | 100.0 | 72.4 | 27.6 |
| $P_{80}$ Size microns | 155 | 187 | 21 |
| | | (calculated) | |
| Gold Distribution % | 100.0 | 58.2 | 41.8 |

TABLE 15

Ore Sample #4

| Test | Test Feed | Flotation | Conditioning | Acid pH Adjust | Weight Recovery % | Au Recovery % | Sulfide Sulfur Recovery % | Concentrate Au % | Tail Leach Au % | Total Au % |
|---|---|---|---|---|---|---|---|---|---|---|
| | | | | | Recovery From Test Feed Into Concentrate | | | Total Au Recovered From Test Feed | | |
| 4-13 | U/F | G1 pH 5.7 | none | yes | 11.08 | 43.1 | 87.6 | 21.3 | 15.0 | 36.3 |
| 4-6 | U/F | G1 pH 5.7 | none | yes | 11.67 | 47.3 | 89.0 | 23.4 | 13.8 | 37.3 |
| 4-7 | U/F | G3 pH 5.5-6.0 | none | no | 10.96 | 45.6 | 88.3 | 22.6 | 14.1 | 36.7 |
| 4-8 | U/F | G4 pH 5.5-6.0 | none | no | 12.05 | 48.4 | 90.5 | 24.0 | 13.5 | 37.5 |
| 4-14 | U/F | G3 pH 5.7-6.0 | G8 10 minutes | no | 12.01 | 46.9 | 90.0 | 23.2 | 13.4 | 36.7 |
| 4-15 | U/F | G5 pH 5.7-6.0 | G5 10 minutes | no | 11.59 | 46.2 | 89.9 | 22.9 | 13.4 | 36.3 |
| 4-16 | O/F | G1 pH 5.7 | none | yes | 21.18 | 44.6 | 73.0 | 22.5 | 17.6 | 40.1 |
| 4-9 | O/F | G1 pH 5.7 | none | yes | 17.37 | 43.2 | 68.7 | 21.8 | 19.3 | 41.1 |
| 4-10 | O/F | G3 pH 5.5-6.0 | none | no | 17.69 | 44.1 | 68.0 | 22.3 | 19.1 | 41.4 |
| 4-72-2 | O/F | G3 pH 5.7-6.0 | G6 20 minutes | no | 27.3 | 61.6 | 87.9 | 31.1 | 12.4 | 43.5 |
| 4-72-1 | O/F | G5 | G8 20 minutes | no | 21.75 | 57.3 | 89.3 | 28.9 | 14.0 | 43.0 |

TABLE 16

Ore Sample #4

| Test | Test Feed | Flotation | Conditioning | Acid pH Adjust | Weight Recovery % | Au Recovery % | Sulfide Sulfur Recovery % | Concentrate Au % | Tail Leach Au % | Total Au % |
|---|---|---|---|---|---|---|---|---|---|---|
| | | | | | Recovery From Ore Sample Into Concentrate | | | Total Au Recovered From Ore Sample | | |
| 4-11 | Whole Ore | G1 pH 5.5 | none | yes | 17.69 | 47.6 | 83.9 | 47.6 | 31.0 | 78.6 |
| 4-12 | Whole Ore | G3 pH 5.7-6.0 | G6 10 minutes | no | 12.13 | 48.2 | 85.5 | 48.2 | 29.6 | 77.8 |
| 4-13 + 4-16 | Combined U/F + O/F | G1 | none | yes | | | | 43.8 | 32.6 | 76.4 |
| 4-6 + 4-9 | Combined U/F + O/F | G1 | none | yes | | | | 45.2 | 33.1 | 78.3 |
| 4-7 + 4-10 | Combined U/F + O/F | G3 | none | no | | | | 44.9 | 33.2 | 78.1 |
| 4-14 + 4-72-2 | Combined U/F + O/F | G3 | G6 | no | | | | 54.3 | 25.8 | 80.1 |
| 4-15 + 4-72-1 | Combined U/F + O/F | G5 | G8 | no | | | | 51.8 | 27.4 | 79.2 |

TABLE 17

Ore Sample #5

| Test | Test Feed | Flotation | Conditioning | Acid pH Adjust | Weight Recovery % | Au Recovery % | Sulfide Sulfur Recovery % | Concentrate Au % | Tail Leach Au % | Total Au % |
|---|---|---|---|---|---|---|---|---|---|---|
| | | | | | Recovery From Test Feed Into Concentrate | | | Total Au Recovered From Test Feed | | |
| 5-13 | U/F | G1 pH 5.7 | none | yes | 11.28 | 49.2 | 89.9 | 26.6 | 6.5 | 33.0 |
| 5-6 | U/F | G1 pH 5.7 | none | yes | 10.70 | 46.8 | 91.2 | 25.3 | 6.8 | 32.1 |
| 5-7 | U/F | G3 pH 5.5-6.0 | none | no | 12.52 | 53.7 | 95.7 | 29.0 | 6.4 | 35.4 |

TABLE 17-continued

Ore Sample #5

| Test | Test Feed | Flotation Test Conditions | | | Recovery From Test Feed Into Concentrate | | | Total Au Recovered From Test Feed | | |
|---|---|---|---|---|---|---|---|---|---|---|
| | | Flotation | Conditioning | Acid pH Adjust | Weight Recovery % | Au Recovery % | Sulfide Sulfur Recovery % | Concentrate Au % | Tail Leach Au % | Total Au % |
| 5-8 | U/F | G4 pH 5.5-6.0 | none | no | 12.83 | 52.1 | 96.3 | 28.2 | 6.6 | 34.8 |
| 5-14 | U/F | G3 pH 5.7-6.0 | G6 10 minutes | no | 16.14 | 59.9 | 94.5 | 32.4 | 5.7 | 38.1 |
| 5-15 | U/F | G5 pH 5.7-6.0 | G8 10 minutes | no | 13.95 | 55.8 | 92.7 | 30.2 | 6.3 | 36.4 |
| 5-16 | O/F | G1 pH 5.7 | none | yes | 13.41 | 26.5 | 31.2 | 12.2 | 13.0 | 25.1 |
| 5-9 | O/F | G1 pH 5.7 | none | yes | 14.51 | 28.8 | 43.5 | 13.2 | 11.2 | 24.4 |
| 5-10 | O/F | G3 pH 5.5-6.0 | none | no | 15.41 | 27.2 | 44.1 | 12.7 | 12.2 | 24.9 |
| 5-74-1 | O/F | G3 pH 5.7-6.0 | G6 20 minutes | no | 14.69 | 30.3 | 43.4 | 13.9 | 12.3 | 26.3 |
| 5-74-2 | O/F | G5 | G8 20 minutes | no | 19.05 | 40.9 | 63.7 | 18.8 | 11.2 | 30.0 |

TABLE 18

Ore Sample #5

| Test | Test Feed | Flotation Test Conditions | | | Recovery From Ore Sample Into Concentrate | | | Total Au Recovered From Ore Sample | | |
|---|---|---|---|---|---|---|---|---|---|---|
| | | Flotation | Conditioning | Acid pH Adjust | Weight Recovery % | Au Recovery % | Sulfide Sulfur Recovery % | Concentrate Au % | Tail Leach Au % | Total Au % |
| 5-11 | Whole Ore | G1 pH 5.5 | none | yes | 10.09 | 35.2 | 70.0 | 35.2 | 17.8 | 53.0 |
| 5-12 | Whole Ore | G3 pH 5.7-6.0 | G6 10 minutes | no | 10.10 | 35.3 | 75.4 | 35.3 | 19.1 | 54.4 |
| 5-13 + 5-16 | Combined U/F + O/F | G1 | none | yes | | | | 38.8 | 19.4 | 58.2 |
| 5-6 + 5-9 | Combined U/F + O/F | G1 | none | yes | | | | 38.5 | 18.0 | 56.5 |
| 5-7 + 5-10 | Combined U/F + O/F | G3 | none | no | | | | 41.7 | 18.6 | 60.3 |
| 5-14 + 5-74-1 | Combined U/F + O/F | G3 | G6 | no | | | | 46.3 | 18.0 | 64.3 |
| 4-15 + 5-74-2 | Combined U/F + O/F | G5 | G8 | no | | | | 49.0 | 17.4 | 66.4 |

TABLE 19

Ore Sample #6

| Test | Test Feed | Flotation Test Conditions | | | Recovery From Test Feed Into Concentrate | | | Total Au Recovered From Test Feed | | |
|---|---|---|---|---|---|---|---|---|---|---|
| | | Flotation | Conditioning | Acid pH Adjust | Weight Recovery % | Au Recovery % | Sulfide Sulfur Recovery % | Concentrate Au % | Tail Leach Au % | Total Au % |
| 6-10 | U/F | G1 pH 5.7 | none | yes | 17.18 | 59.8 | 92.5 | 34.8 | 5.9 | 40.6 |
| 6-3 | U/F | G1 pH 5.7 | none | yes | 19.93 | 59.9 | 90.2 | 34.8 | 5.5 | 40.4 |
| 6-4 | U/F | G3 pH 5.5-6.0 | none | no | 19.86 | 61.1 | 89.6 | 35.5 | 5.6 | 41.1 |
| 6-5 | U/F | G4 pH 5.5-6.0 | none | no | 20.75 | 63.9 | 90.3 | 37.2 | 5.3 | 42.5 |
| 6-11 | U/F | G3 pH 5.7-6.0 | G6 10 minutes | no | 18.81 | 61.9 | 92.7 | 36.0 | 6.2 | 42.2 |
| 6-12 | U/F | G5 pH 5.7-6.0 | G8 10 minutes | no | 17.70 | 60.1 | 91.3 | 34.9 | 5.9 | 40.8 |

TABLE 19-continued

Ore Sample #6

| | | Flotation Test Conditions | | | Recovery From Test Feed Into Concentrate | | | Total Au Recovered From Test Feed | | |
|---|---|---|---|---|---|---|---|---|---|---|
| Test | Test Feed | Flotation | Conditioning | Acid pH Adjust | Weight Recovery % | Au Recovery % | Sulfide Sulfur Recovery % | Concentrate Au % | Tail Leach Au % | Total Au % |
| 6-13 | O/F | G1 pH 5.7 | none | yes | 15.03 | 45.0 | 61.3 | 18.8 | 9.3 | 28.1 |
| 6-6 | O/F | G1 pH 5.7 | none | yes | 15.68 | 40.5 | 53.8 | 16.9 | 9.0 | 26.0 |
| 6-7 | O/F | G3 pH 5.5-6.0 | none | no | 17.90 | 43.1 | 60.6 | 18.0 | 8.7 | 26.7 |
| 6-14 | O/F | G3 | G6 20 minutes | no | 18.06 | 51.9 | 79.7 | 21.7 | 8.8 | 30.5 |
| 6-15 | O/F | G5 pH 5.7-6.0 | G8 20 minutes | no | 18.36 | 53.3 | 80.9 | 22.3 | 8.4 | 30.7 |

TABLE 20

Ore Sample #6

| | | Flotation Test Conditions | | | Recovery From Ore Sample Into Concentrate | | | Total Au Recovered From Ore Sample | | |
|---|---|---|---|---|---|---|---|---|---|---|
| Test | Test Feed | Flotation | Conditioning | Acid pH Adjust | Weight Recovery % | Au Recovery % | Sulfide Sulfur Recovery % | Concentrate Au % | Tail Leach Au % | Total Au % |
| 6-8 | Whole Ore | G1 pH 5.5 | none | yes | 12.35 | 47.9 | 83.3 | 47.9 | 16.1 | 64.0 |
| 6-9 | Whole Ore | G3 | G6 | no | 12.82 | 47.8 | 85.7 | 47.8 | 17.2 | 65.0 |
| 6-10 + 6-13 | Combined U/F + O/F | G1 | none | yes | | | | 53.6 | 15.1 | 68.7 |
| 6-3 + 6-6 | Combined U/F + O/F | G1 | none | yes | | | | 51.7 | 14.5 | 66.3 |
| 6-4 + 6-7 | Combined U/F + O/F | G3 | none | no | | | | 53.5 | 14.3 | 67.8 |
| 6-11 + 6-14 | Combined U/F + O/F | G3 | G6 | no | | | | 57.7 | 14.9 | 72.7 |
| 6-12 + 6-15 | Combined U/F + O/F | G5 | G8 | no | | | | 57.2 | 14.3 | 71.6 |

Tables 15 and 16 summarize test results for ore sample #4. Table 15 shows results for the separate testing performed on underflow and overflow fractions, designated as "U/F" and "O/F" in the tables. Table 16 shows combined results for corresponding overflow and underflow test pairs compared with flotation tests performed on a whole ore sample. As shown in Table 15, for the underflow fractions of ore sample #4, both gold recovery in the concentrate and total gold recovery including tails leaching do not vary greatly between the different test conditions. For overflow fractions, gold recovery in the concentrate is higher in tests using carbon dioxide in the flotation gas preceded by conditioning with a gas containing carbon dioxide (tests 4-72-2 and 4-72-1), however total gold recovery from overflow samples including tails leaching is affected by a much smaller amount. As shown in Table 16, separate flotation of overflow and underflow fractions showed only a small increase in total gold recovery for the best performing tests relative to flotation of whole ore samples (tests 4-11 and 4-12), and whole ore processing with carbon dioxide (test 4-12) shows no total gold recovery increase over conventional air flotation (test 4-11). Again, ore sample #4 is a higher-quality ore that is generally amenable to conventional air flotation and that does not contain significant qualities of acid-consuming carbonate.

Referring to Table 17 in relation to sample #5, total gold recovery is significantly higher for both overflow and underflow fractions using carbon dioxide gas, with best gold recoveries corresponding with tests including both conditioning and flotation with gas compositions including carbon dioxide. Particularly noteworthy is the information summarized in Table 18. For whole ore sample tests (5-11 and 5-12) total gold recovery is improved by only a small amount using carbon dioxide gas (from 53.0% to 54.4%). However, combined gold recoveries from separate flotation of underflow and overflow fractions using gas containing carbon dioxide during flotation and with prior conditioning with a gas containing carbon dioxide resulted in much higher gold recoveries (more than 11 percentage points), with the combined testing using a mixture of $CO_2$ and $N_2$ (17:83) providing the largest increase (more than 13 percentage points).

Results for tests on ore sample #6 summarized in Table 19 show improvements in total gold recovery for some underflow tests and some overflow tests relative to baseline air flotation, although not to as great an extent as experienced for ore sample #5. As shown in Table 20, conditioning and flotation using carbon dioxide increased total gold recovery only by a small amount on whole ore sample tests (from 64.0% to 65.0%). However, total gold recoveries for ore sample #6 increase significantly for combined results of separate flotation on overflow and underflow fractions. As with the results for ore sample #5, these improved gold recoveries are obtained without the large sulfuric acid additions and pH control issues resulting from the presence of significant amounts of acid-consuming carbonates.

EXAMPLE 3

Ore sample #2 in an aqueous slurry at about 25 weight % solids density is conditioned for 20 minutes with conditioning gas of composition G6 (100% $CO_2$) by sparging the conditioning gas into the slurry contained in a laboratory flotation cell. Samples of the slurry are taken at various times and slurry liquid is analyzed for concentrations of various dissolved components. Table 21 summarizes results of the solution analysis over time for a number of components. Calcium concentration increases moderately over time, which may be due at least in part to cleaning calcium-containing surface species from sulfide mineral grains. Particularly noticeable is the large increase over time of dissolved iron, which increased by a factor of about 5, which may be due at least in part to dissolution of iron-containing species, such as iron hydroxides, from sulfide mineral grains. Such cleaning of sulfide mineral grains may be particularly beneficial for effective flotation of sulfide minerals.

either process water or tap water. Analyses on two different process waters and tap water used in tests are shown in Table 23. Conditioning tests use gas compositions G1, G2, G5 and G6 as conditioning gases. Gas sparging rates during conditioning tests with the various gases are summarized in Table 24. For tests using 100% nitrogen gas (G2), prior to gas sparging sulfuric acid is added to decompose carbonates and attempt to achieve a reduction in the slurry pH to a target pH of 5.5, and additional sulfuric acid is added periodically to attempt to maintain approximately that target pH. Following conditioning with the conditioning gas, each ore sample is subjected to flotation using the same gas composition for the flotation gas as was used for the conditioning gas, except that tests using G6 as a conditioning gas are followed by flotation with a flotation gas of composition G3. Slurry samples are taken periodically during conditioning and slurry liquid is analyzed for concentration of selected dissolved components. Following flotation, flotation concentrates are analyzed by XRD for the purpose of estimating mineralogical composition information for the concentrates. After conditioning and prior to flotation, potassium amyl xanthate collector is added to the slurry equivalent to about 100 grams per tonne of ore and AERO® MX6205 promoter is added to the slurry equivalent to about 50 grams per tonne of ore. Tests on ore Sample #8 are performed using process water and also using tap water.

TABLE 21

Ore Sample #2

Concentration in Solution at Different $CO_2$ Conditioning Times

| | | 0 minute | 1 minute | 2 minutes | 3 minutes | 5 minutes | 10 minutes | 20 minutes |
|---|---|---|---|---|---|---|---|---|
| Ag | mg/l | <0.25 | <0.25 | <0.25 | <0.25 | <0.25 | <0.25 | 0.8 |
| Al | mg/l | 6.0 | 8.2 | 15.3 | 11.7 | 12.6 | 12.5 | 11.8 |
| As | mg/l | 0.6 | 0.7 | 0.9 | 1.0 | 0.6 | 0.9 | 0.6 |
| Ba | mg/l | 0.6 | 0.8 | 1.8 | 1.5 | 1.7 | 1.6 | 1.9 |
| Be | mg/l | <0.05 | <0.05 | <0.05 | <0.05 | <0.05 | <0.05 | <0.05 |
| Ca | mg/l | 497 | 531 | 516 | 550 | 558 | 568 | 587 |
| Cd | mg/l | <0.25 | <0.25 | <0.25 | <0.25 | <0.25 | <0.25 | <0.25 |
| Co | mg/l | 0.4 | 0.6 | 0.5 | 0.6 | 0.6 | 0.6 | 0.7 |
| Cr | mg/l | <0.25 | <0.25 | <0.25 | <0.25 | <0.25 | <0.25 | <0.25 |
| Cu | mg/l | 0.7 | <0.25 | <0.25 | <0.25 | <0.25 | <0.25 | <0.25 |
| Fe | mg/l | 9.2 | 21.4 | 34.3 | 35.2 | 39.5 | 40.8 | 49.1 |
| K | mg/l | 342.1 | 359.9 | 326.7 | 346.9 | 351.6 | 354.8 | 354.4 |
| Mg | mg/l | 168.5 | 177.7 | 168.3 | 177.4 | 179.1 | 181.0 | 183.7 |
| Mn | mg/l | 7.4 | 12.7 | 10.2 | 13.7 | 14.0 | 13.4 | 14.2 |
| Mo | mg/l | 0.7 | <0.25 | <0.25 | <0.25 | <0.25 | <0.25 | <0.25 |
| Na | mg/l | 1145 | 1191 | 1052 | 1155 | 1162 | 1169 | 1167 |
| Ni | mg/l | 1.8 | 2.2 | 2.0 | 2.2 | 2.3 | 2.2 | 2.2 |
| Pb | mg/l | <0.25 | <0.25 | <0.25 | <0.25 | <0.25 | <0.25 | <0.25 |
| S | mg/l | 1392 | 1466 | 1302 | 1388 | 1404 | 1411 | 1415 |
| Sb | mg/l | <0.25 | <0.25 | <0.25 | <0.25 | <0.25 | <0.25 | <0.25 |
| Se | mg/l | <0.25 | <0.25 | <0.25 | <0.25 | <0.25 | <0.25 | <0.25 |
| Si | mg/l | 20.5 | 28.0 | 48.6 | 36.8 | 42.9 | 41.7 | 39.0 |
| Sn | mg/l | <0.25 | <0.25 | <0.25 | <0.25 | <0.25 | <0.25 | <0.25 |
| Sr | mg/l | 1.0 | 1.1 | 1.0 | 1.0 | 1.0 | 1.0 | 1.1 |
| Ti | mg/l | <0.25 | <0.25 | 0.3 | 0.3 | 0.3 | 0.3 | 0.3 |
| Tl | mg/l | <0.5 | <0.5 | <0.5 | <0.5 | <0.5 | <0.5 | <0.5 |
| V | mg/l | <0.25 | <0.25 | <0.25 | <0.25 | <0.25 | <0.25 | <0.25 |
| Zn | mg/l | <0.25 | 5.7 | 6.1 | 9.3 | 9.7 | 8.8 | 9.6 |

EXAMPLE 4

One kilogram samples of gold-bearing sulfide ore materials (ore samples #7, #8, #9 and #10) are each comminuted to a $P_{80}$ size of approximately 140 microns and wet rotary split into quarter splits that are used as feed for four different conditioning tests. Mineralogical composition information on the sample estimated from XRD analysis is summarized in Table 22. For testing, the sample spits are slurried with

TABLE 22

| Component | Ore Sample #7 | Ore Sample #8 | Ore Sample #9 | Ore Sample #10 |
|---|---|---|---|---|
| Barite - % | 3 | 4 | | 11.2 |
| Calcite - % | | 14 | 22.2 | |
| Dolomite - % | 16 | 31 | 10 | 10.4 |
| Gypsum - % | | | 3.7 | |

TABLE 22-continued

| Component | Ore Sample #7 | Ore Sample #8 | Ore Sample #9 | Ore Sample #10 |
|---|---|---|---|---|
| Kaolinite - % | | | 7 | |
| Illite - % | 17 | 14 | 11.1 | |
| Marcasite - % | | | 2 | 3 |
| Muscovite - % | | | | 24.3 |
| Pyrite - % | 3 | 3 | 1.2 | 2.7 |
| Quartz - % | 61 | 35 | 43 | 48.4 |

TABLE 23

| | Process Water #1 (mg/L) | Process Water #2 (mg/L) | Tap Water (mg/L) |
|---|---|---|---|
| Ag | <0.050 | <0.050 | <0.050 |
| Ad | 0.13 | 0.34 | <0.050 |
| As | 0.68 | 2.3 | <0.050 |
| Ba | <0.020 | <0.020 | <0.020 |
| Be | <0.020 | <0.020 | <0.020 |
| Ca | 662 | 584 | 21 |
| Cd | <0.050 | <0.050 | <0.050 |
| Co | 0.95 | 0.43 | <0.050 |
| Cr | <0.050 | <0.050 | <0.050 |
| Cu | <0.050 | 0.20 | <0.050 |
| Fe | 0.27 | 0.29 | <0.050 |
| K | 435 | 253 | <0.050 |
| Mg | 83 | 42 | 5.4 |
| Mn | 0.09 | 0.026 | <0.010 |
| Mo | 2.5 | 1.8 | <0.050 |
| Na | <0.050 | <0.050 | 11.2 |
| Ni | 0.69 | 1.4 | <0.050 |
| Pb | <0.050 | <0.050 | <0.050 |
| S | 1604 | 1233 | 12.9 |
| Sb | 0.097 | 0.212 | <0.050 |
| Se | <0.050 | <0.050 | <0.050 |
| Si | 2.4 | 1.1 | <0.100 |
| Sn | <0.050 | 0.15 | |
| Sr | 1.8 | 1.2 | 0.12 |
| Ti | <0.050 | <0.050 | <0.050 |
| Tl | 0.28 | 0.37 | <0.100 |
| V | <0.050 | <0.050 | <0.050 |
| Zn | <0.050 | <0.050 | <0.050 |

TABLE 24

| Conditioning Gas Composition | Conditioning Gas Sparge Rate (L/min) |
|---|---|
| G1 | <0.002 (slight aeration) |
| G2 | ~1.0 |
| G6 | ~0.8 |
| G5 | ~1.8 (~0.8 $CO_2$ + ~1.0 $N_2$) |

Tables 25-29 summarize pH results as a function of time for tests on the different ore samples. FIGS. 11-14 graphically summarize changes in concentrations of calcium, magnesium, iron and sulfur in the slurry liquid as a function of time as a percentage relative to the initial concentration at the beginning of the test. Tests using sulfuric acid and nitrogen gas uniformly show larger increases in concentrations of dissolved calcium and magnesium, which may reflect in part the decomposition of carbonates with addition of sulfuric acid. Dissolved iron concentrations tend to increase significantly for tests using nitrogen, carbon dioxide or a mixture of carbon dioxide and nitrogen, which may indicate that conditions in all those tests may be conducive to removing oxidized iron species, such as iron hydroxides, from sulfide mineral grain surfaces. The air tests uniformly show a reduction over time of dissolved iron concentrations, indicating iron may be precipitating, which is generally a detrimental condition for effective sulfide mineral flotation. With respect to sulfur in solution, only the tests using sulfuric acid and nitrogen gas show significant increases in concentration over time.

TABLE 25

Ore Sample #7/Process Water

| | pH | | | |
|---|---|---|---|---|
| Conditioning | G1 | G2* | G5 | G6 |
| 0 min | 6.50 | 4.79 | 6.58 | 6.60 |
| 2 min | 6.32 | 5.63 | 5.36 | 5.04 |
| 5 min | 6.25 | 5.45 | 5.41 | 5.11 |
| 10 min | 6.14 | 5.62 | 5.46 | 5.17 |
| 20 min | 6.14 | 4.91 | 5.50 | 5.23 |
| 30 min | 6.20 | 5.20 | 5.54 | 5.25 |
| Flotation | G1 | G2 | G5 | G3 |
| 0 min | 6.37 | 5.14 | 5.57 | 5.29 |
| After Collector Addition | 6.40 | 5.21 | 5.51 | 5.22 |
| 6 min | 6.69 | 5.78 | 5.87 | 5.54 |

*$H_2SO_4$ addition equal to 2.120 kg per tonne of ore

TABLE 26

Ore Sample #8/Process Water

| | pH | | | |
|---|---|---|---|---|
| Conditioning | G1 | G2* | G5 | G6 |
| 0 min | 6.82 | 5.85 | 6.86 | 6.85 |
| 2 min | 6.73 | 4.13 | 5.95 | 5.62 |
| 5 min | 6.83 | 5.54 | 5.96 | 5.68 |
| 10 min | 7.07 | 5.44 | 6.00 | 5.70 |
| 20 min | 7.39 | 5.48 | 6.02 | 5.72 |
| 30 min | 7.51 | 5.42 | 6.05 | 5.76 |
| Flotation | G1 | G2 | G5 | G3 |
| 0 min | 7.60 | 5.10 | 6.03 | 5.73 |
| After Collector Addition | 7.62 | | 6.00 | 5.70 |
| 6 min | 7.72 | 5.89 | 6.29 | 6.40 |

*$H_2SO_4$ addition equal to 21.032 kg per tonne of ore

TABLE 27

Ore Sample #8/Tap Water

| | pH | | | |
|---|---|---|---|---|
| Conditioning | G1 | G2* | G5 | G6 |
| 0 min | 6.79 | 6.70 | 6.67 | 6.65 |
| 2 min | 6.63 | 5.45 | 5.78 | 5.53 |
| 5 min | 6.71 | 5.53 | 5.84 | 5.60 |
| 10 min | 6.93 | 5.53 | 5.90 | 5.64 |
| 20 min | 7.27 | 5.59 | 5.93 | 5.67 |
| 30 min | 7.42 | 5.38 | 5.95 | 5.70 |
| Flotation | G1 | G2 | G5 | G3 |
| 0 min | 7.47 | 5.20 | 5.97 | 5.68 |
| After Collector Addition | 7.50 | 5.10 | 5.91 | 5.64 |
| 6 min | 7.73 | 5.02 | 6.22 | 5.84 |

*$H_2SO_4$ addition equal to 16.516 kg per tonne of ore

TABLE 28

Ore Sample #9/Process Water

| Conditioning | pH | | | |
|---|---|---|---|---|
| | G1 | G2* | G5 | G6 |
| 0 min | 7.80 | 5.29 | 7.66 | 7.73 |
| 2 min | 7.82 | 5.85 | 6.08 | 5.80 |
| 5 min | 7.84 | 5.57 | 6.15 | 5.84 |
| 10 min | 7.84 | 5.11 | 6.19 | 5.86 |
| 20 min | 7.84 | 5.40 | 6.19 | 5.88 |
| 30 min | 7.86 | 5.08 | 6.21 | 5.90 |

| Flotation | G1 | G2 | G5 | G3 |
|---|---|---|---|---|
| 0 min | 7.97 | 5.11 | 6.15 | 5.90 |
| After Collector Addition | 7.97 | 5.50 | 6.15 | 5.84 |
| 6 min | 8.01 | 5.49 | 6.41 | 6.47 |

*$H_2SO_4$ addition equal to 32.168 kg per tonne of ore

TABLE 29

Ore Sample #10/Process Water

| Conditioning | pH | | | |
|---|---|---|---|---|
| | G1 | G2* | G5 | G6 |
| 0 min | 7.64 | 4.68 | 7.48 | 7.58 |
| 2 min | 7.68 | 5.36 | 5.52 | 5.23 |
| 5 min | 7.72 | 5.18 | 5.56 | 5.25 |
| 10 min | 7.75 | 5.51 | 5.62 | 5.26 |
| 20 min | 7.75 | 5.12 | 5.66 | 5.32 |
| 30 min | 7.77 | 4.57 | 5.68 | 5.34 |

TABLE 29-continued

Ore Sample #10/Process Water

| Flotation | pH | | | |
|---|---|---|---|---|
| | G1 | G2 | G5 | G3 |
| 0 min | 7.87 | 4.39 | 5.65 | 5.32 |
| After Collector Addition | 7.87 | 5.21 | 5.65 | 5.28 |
| 6 min | 8.02 | | 6.07 | 6.00 |

*$H_2SO_4$ addition equal to 8.220 kg per tonne of ore

Table 30 summarizes mineralogical composition information on flotation concentrates estimated from XRD analysis for process water tests. Notably, for tests using sulfuric acid and nitrogen gas on ore samples that contain high concentrations of calcite (ore samples #8 and #9), significant gypsum is identified in the concentrates, which may indicate precipitation of calcium sulfate during testing as a consequence of sulfuric acid addition and corresponding decomposition of a portion of the calcite. Also, Tables 25-29 provide the quantities of sulfuric acid added during the nitrogen gas tests, expressed on a basis of kilograms of sulfuric acid requirement per tonne of ore. As seen in Tables 25-29, ore samples #8 and #9 that contain significant calcite concentrations have much higher sulfuric acid requirements than ore samples #7 and #10 that contain lower levels of carbonate minerals and only in the form of dolomite. The high sulfuric acid requirements for ore samples #8 and #9 together with significant levels of gypsum in the resulting concentrates may indicate that the calcite in those samples is very reactive in consuming sulfuric acid relative to the dolomite content of ore samples #7 and #10. Gypsum precipitation may present a significant processing problem in that the presence of very fine particles of gypsum precipitate may significantly complicate filtration of concentrate in preparation for further processing.

TABLE 30

Process Water Tests - Concentrate XRD

| Ore Sample | Gas | Gangue-silicate | | | Sulfide | | Carbonate | | Sulfate | | |
|---|---|---|---|---|---|---|---|---|---|---|---|
| | | quartz % | illite % | kaolinite % | pyrite % | marcasite % | dolomite % | calcite % | jarosite % | gypsum % | barite % |
| #7 | G1 | 30.05 | 25.7 | | 15.5 | 10.7 | 12.4 | | 5.2 | | |
| | G2 | 39.2 | 20.7 | | 13.6 | 10.0 | 12.1 | | 4.5 | | |
| | G5 | 35.4 | 22.6 | | 14.6 | 11.0 | 11.7 | | 4.7 | | |
| | G6 | 38.0 | 19.5 | | 14.7 | 11.1 | 12.3 | | 4.4 | | |
| #8 | G1 | 23.3 | 20.7 | | 14.7 | 14.1 | 18.7 | 8.4 | | | |
| | G2 | 28.0 | 19.2 | | 11.5 | 12.1 | 18.7 | 3.3 | | 7.0 | |
| | G5 | 27.9 | 20.9 | | 12.6 | 12.1 | 19.7 | 6.8 | | | |
| | G6 | 29.5 | 17.8 | | 13.3 | 12.8 | 20.3 | 6.4 | | | |
| #9 | G1 | 24.9 | 29.3 | 5.9 | 9.5 | 9.0 | 8.6 | 12.8 | | | |
| | G2 | 26.0 | 20.9 | 5.1 | 12.2 | 12.9 | 5.4 | 4.9 | | 13.1 | |
| | G5 | 26.6 | 20.5 | 4.8 | 14.8 | 15.2 | 8.3 | 9.7 | | | |
| | G6 | 28.5 | 19.5 | 4.4 | 13.5 | 14.8 | 9.1 | 10.2 | | | |
| #10 | G1 | 27.4 | 19.1 | | 17.8 | 20.5 | 9.4 | | 2.4 | | 3.1 |
| | G2 | 36.0 | 22.2 | | 10.7 | 18.8 | 8.8 | | 2.0 | | 1.4 |
| | G5 | 34.8 | 17.5 | | 13.1 | 21.8 | 9.1 | | 2.2 | | 1.5 |
| | G6 | 36.9 | 18.4 | | 11.6 | 19.6 | 9.7 | | 1.8 | | 1.9 |

The foregoing discussion of the invention and different aspects thereof has been presented for purposes of illustration and description. The foregoing is not intended to limit the invention to only the form or forms specifically disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art. Although the description of the invention has included description of one or more possible embodiments and certain variations and modifications, other variations and modifications are within the scope of the invention, e.g., as may be within the skill and knowledge of those in the art after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. Furthermore, any feature described or claimed with respect to any disclosed variation may be combined in any combination with one or more of any other features of any other variation or variations, to the extent that the features are not necessarily technically compatible, and all such combinations are within the scope of the present invention. The description of a feature or features in a particular combination do not exclude the inclusion of an additional feature or features. Processing steps and sequencing are for illustration only, and such illustrations do not exclude inclusion of other steps or other sequencing of steps. Additional steps may be included between illustrated processing steps or before or after any illustrated processing step.

The terms "comprising", "containing", "including" and "having", and grammatical variations of those terms, are intended to be inclusive and nonlimiting in that the use of such terms indicates the presence of some condition or feature, but not to the exclusion of the presence also of any other condition or feature. The use of the terms "comprising", "containing", "including" and "having", and grammatical variations of those terms in referring to the presence of one or more components, subcomponents or materials, also include and is intended to disclose the more specific embodiments in which the term "comprising", "containing", "including" or "having" (or the variation of such term) as the case may be, is replaced by any of the narrower terms "consisting essentially of" or "consisting of" or "consisting of only" (or the appropriate grammatical variation of such narrower terms). For example, the a statement that some thing "comprises" a stated element or elements is also intended to include and disclose the more specific narrower embodiments of the thing "consisting essentially of" the stated element or elements, and the thing "consisting of" the stated element or elements. Examples of various features have been provided for purposes of illustration, and the terms "example", "for example" and the like indicate illustrative examples that are not limiting and are not to be construed or interpreted as limiting a feature or features to any particular example. The term "at least" followed by a number (e.g., "at least one") means that number or more than that number. The term at "at least a portion" means all or a portion that is less than all. The term "at least a part" means all or a part that is less than all.

What is claimed is:

1. A method for processing mineral material containing precious metal with one or more sulfide minerals and containing non-sulfide gangue minerals comprising acid-consuming carbonate, the method comprising flotation processing, wherein the flotation processing comprises:
   flotation of the mineral material in aqueous liquid medium at a pH less than pH 7 with flotation gas to prepare a flotation concentrate enriched in sulfide minerals and associated precious metal relative to the mineral material as fed to the flotation and a flotation tail enriched in non-sulfide gangue minerals relative to the mineral material as fed to the flotation; and
   prior to the flotation, conditioning the mineral material, comprising treating a slurry including the mineral material with a conditioning gas comprising at least 5 volume percent carbon dioxide; and
   wherein:
   the mineral material comprises at least 1 weight percent acid-consuming carbonate before and after the conditioning;
   the conditioning comprises reducing the pH of the slurry from greater than pH 7 to a range of from pH 5 to pH 6.2 due mostly or entirely to carbon dioxide in the conditioning gas;
   during the conditioning and the flotation no more than 10 percent of acid-consuming carbonate in the mineral material as fed to the conditioning is decomposed;
   the flotation is conducted at a pH in a range of pH 5 to pH 6.2; and
   the mineral material comprises at least 1 weight percent acid-consuming carbonate when the mineral material is fed to the flotation and the flotation tail and the flotation concentrate together comprise at least 1 weight percent acid-consuming carbonate relative to the combined weight of the flotation tail and the flotation concentrate.

2. A method according to claim 1, wherein the flotation is conducted at a pH in a range of from pH 5 to pH 6.5.

3. A method according to claim 2, wherein the flotation gas comprises at least 5 volume percent carbon dioxide.

4. A method according to claim 3, wherein the flotation gas is selected from the group consisting of a gas composition consisting essentially of carbon dioxide and nitrogen gas, a gas composition consisting essentially of a mixture of carbon dioxide and air and a gas composition consisting essentially of carbon dioxide.

5. A method according to claim 1, wherein the aqueous liquid medium comprises a combined concentration of dissolved calcium and magnesium of at least 500 milligrams per liter; and
   not more than 10 percent of acid-consuming carbonate in the mineral material as fed to the flotation is decomposed during the flotation.

6. A method according to claim 5, wherein the mineral material comprises at least 3 weight percent acid-consuming carbonate before and after the conditioning and when the mineral material is fed to the flotation, and the flotation tail and the flotation concentrate together comprise at least 3 weight percent acid-consuming carbonate relative to the combined weight of the flotation tail and the flotation concentrate.

7. A method according to claim 5, wherein:
   the mineral material as fed to the flotation comprises at least 0.2 parts per million by weight of gold and the flotation concentrate is enriched in the gold relative to the mineral material as fed to the flotation; and the flotation is a bulk sulfide flotation.

8. A method according to claim 1, wherein the method is essentially in the absence of pH adjustment through addition of acid during or prior to the flotation.

9. A method according to claim 1, wherein the conditioning gas comprises at least 10 volume percent carbon dioxide.

10. A method according to claim 1, wherein the conditioning gas comprises at least 25 volume percent carbon dioxide.

11. A method according to claim 1, wherein the conditioning gas comprises no more than 5 volume percent oxygen gas.

12. A method according to claim 1, wherein the conditioning gas is selected from the group consisting of a mixture of gas comprising at least 98 volume percent of a combination of carbon dioxide and nitrogen gas, a gas composition consisting essentially of carbon dioxide and nitrogen gas and a gas composition consisting essentially of carbon dioxide.

13. A method according to claim 1, wherein:

the mineral material as fed to the flotation comprises at least 0.5 weight percent sulfide sulfur and at least 3.5 weight percent carbonate minerals selected from the group consisting of dolomite, calcite, magnesite and combinations thereof; and the mineral material as fed to the flotation comprises at least 1 weight percent iron-containing sulfide minerals and the flotation concentrate is enriched in the iron-containing sulfide minerals relative to the mineral material as fed to the flotation.

14. A method according to claim 1, wherein the mineral material as fed to the flotation comprises at least 0.5 weight percent sulfide minerals selected from the group consisting of arsenopyrite, arsenian pyrite, arsenian pyrrhotite, arsenian marcasite and combinations thereof and the flotation concentrate is enriched in the sulfide minerals from the group relative to the mineral material as fed to the flotation; and the mineral material as fed to the flotation comprises at least 500 parts per million by weight of arsenic and the flotation concentrate is enriched in the arsenic relative to the mineral material as fed to the flotation.

15. A method according to claim 1, wherein the flotation processing is a first flotation processing, the flotation is a first flotation, the mineral material is first mineral material, the flotation gas is a first flotation gas, the flotation concentrate is a first flotation concentrate and the flotation tail is a first flotation tail, and wherein the method comprises:

size separation of a mineral material feed into at least two fractions, a first said fraction having a smaller weight average particle size and a second said fraction having a larger weight average particle size; wherein the mineral material feed comprises precious metal with one or more sulfide minerals and non-sulfide gangue including acid-consuming carbonate in an amount of at least 1 weight percent relative to the weight of the mineral material feed; and wherein each of the first said fraction and the second said fraction includes a portion of the precious metal from the mineral material feed and a portion of the acid-consuming carbonate from the mineral material feed;

wherein, the first mineral material includes at least a portion of the first said fraction;

second flotation processing a second mineral material including at least a portion of the second said fraction, the second flotation processing comprising second flotation in aqueous liquid medium at a pH less than pH 7 with second flotation gas to prepare a second flotation concentrate enriched in sulfide minerals and associated precious metal relative to the second mineral material as fed to the second flotation and a second flotation tail enriched in non-sulfide gangue minerals relative to the second mineral material as fed to the second flotation.

16. A method according to claim 15, wherein the conditioning is first conditioning and the second flotation processing comprises second conditioning the second mineral material, the second conditioning comprising treating a slurry including the second mineral material with a second conditioning gas comprising at least 5 volume percent carbon dioxide.

17. A method according to claim 15, wherein the second flotation gas comprises at least 5 volume percent carbon dioxide.

18. A method according to claim 15, comprising post-flotation processing of the first flotation concentrate and the second flotation concentrate, comprising oxidative treatment of the first flotation concentrate and the second flotation concentrate to decompose sulfide minerals and expose precious metal.

19. A method according to claim 18, wherein the post-flotation processing comprises:

first oxidative treatment of the first flotation concentrate; and second oxidative treatment of the second flotation concentrate separate from the first oxidative treatment.

20. A method according to claim 19, wherein the post-flotation processing is essentially in the absence of filtration of the first flotation concentrate between the first flotation and the first oxidative treatment.

21. A method according to claim 19, wherein the first oxidative treatment comprises contacting the first flotation concentrate with oxygen gas and calcium-containing base material.

22. A method according to claim 19, wherein the second oxidative treatment is alkaline pressure oxidation.

23. A method according to claim 1, comprising the conditioning and wherein:

the flotation tail and the flotation concentrate together comprise at least 2 weight percent of acid consuming carbonate relative to the combined weight of the flotation tail and the flotation concentrate.

24. A method according to claim 23, wherein the mineral material comprises at least 2 weight percent acid-consuming carbonate before and after the conditioning and when the mineral material is fed to the flotation.

25. A method according to claim 1, wherein the conditioning gas comprises at least 15 volume percent carbon dioxide and at least 75 volume percent nitrogen gas.

26. A method according to claim 1, wherein the mineral material as fed to the conditioning comprises at least 0.2 parts per million by weight of gold and the flotation concentrate is enriched in gold relative to the mineral material as fed to the conditioning.

27. A method according to claim 26, wherein:

the mineral material as fed to the conditioning comprises at least 1000 parts per million by weight arsenic and the flotation concentrate is enriched in arsenic relative to the mineral material as fed to the conditioning; and the mineral material as fed to the conditioning comprises at least 0.5 weight percent sulfide minerals selected from the group consisting of arsenopyrite, arsenian pyrite, arsenian pyrrhotite, arsenian marcasite and combinations thereof and the flotation concentrate is enriched in the sulfide minerals from the group relative to the mineral material as fed to the conditioning.

28. A method according to claim 1, wherein the conditioning gas comprises no more than 1 volume percent oxygen gas.

29. A method according to claim 1, wherein the flotation gas comprises at least 10 volume percent carbon dioxide.

30. A method according to claim 1, wherein the flotation gas consists essentially of a gas mixture of carbon dioxide and air.

31. A method according to claim 1, wherein the conditioning gas is a mixture of gas comprising at least 98 volume percent of a combination of carbon dioxide and nitrogen gas.

32. A method according to claim 1, wherein the flotation gas is a mixture of gas comprising at least 98 volume percent of a combination of carbon dioxide and nitrogen gas.

33. A method according to claim 1, wherein the conditioning gas and the flotation gas each comprises at least 98 volume percent of a combination of carbon dioxide and nitrogen gas.

34. A method according to claim 1, wherein the flotation gas consists essentially of carbon dioxide and nitrogen gas.

35. A method according to claim 1, wherein the conditioning gas consists essentially of carbon dioxide and nitrogen gas.

36. A method according to claim 1, wherein the conditioning gas and the flotation gas each consists essentially of carbon dioxide and nitrogen gas.

37. A method according to claim 1, wherein the conditioning gas consists essentially of carbon dioxide.

* * * * *